US012782694B2

(12) United States Patent
Zhang

(10) Patent No.: US 12,782,694 B2
(45) Date of Patent: Nov. 3, 2026

(54) CAMERA OPTICAL LENS

(71) Applicant: Changzhou AAC Raytech Optronics Co., Ltd., Changzhou City (CN)

(72) Inventor: Tao Zhang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 166 days.

(21) Appl. No.: 18/979,692

(22) Filed: Dec. 13, 2024

(65) Prior Publication Data

US 2026/0086328 A1 Mar. 26, 2026

Related U.S. Application Data

(63) Continuation of application No. PCT/CN2024/120331, filed on Sep. 23, 2024.

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .............................. G02B 9/62; G02B 13/0045
See application file for complete search history.

(56) References Cited

U.S. PATENT DOCUMENTS

2020/0057268 A1* 2/2020 Chen .................. G02B 13/0045
2022/0187575 A1* 6/2022 Oinuma ............. G02B 13/0045
2022/0236531 A1* 7/2022 Chang ...................... G02B 9/62
2023/0228973 A1* 7/2023 Yeh .......................... G02B 9/62 359/752

* cited by examiner

*Primary Examiner* — Nicholas R. Pasko
(74) *Attorney, Agent, or Firm* — Wiersch Law Group

(57) ABSTRACT

A camera optical lens sequentially includes six lenses: a first lens having negative refractive power, a second lens having positive refractive power, a third lens having positive refractive power, a fourth lens having negative refractive power, a fifth lens having positive refractive power, and a sixth lens having negative refractive power. Following relational expressions are satisfied: $7.00 \leq (f2-f4)/f \leq 10.00$; $2.50 \leq (d1+d3)/d2 \leq 4.50$; $-0.70 \leq R1/R2 \leq -0.20$; $-5.00 \leq R7/R6 \leq -1.50$. The camera optical lens according to the present disclosure has excellent optical characteristics of sufficient aberration correction, large aperture, wide-angle and ultra-thinness, and is particularly suitable for a mobile phone camera lens assembly and a WEB camera lens which are composed of camera elements such as CCD, CMOS with high resolution and a vehicle-mounted lens.

10 Claims, 10 Drawing Sheets

CAMERA OPTICAL LENS

CROSS-REFERENCE TO RELATED APPLICATIONS

This application is a continuation of International Application No. PCT/CN2024/120331, filed on Sep. 23, 2024, which is hereby incorporated by reference in its entirety.

TECHNICAL FIELD

The present disclosure relates to the field of optical lens and, in particular to a camera optical lens applicable to handheld terminal devices such as smart phones, digital cameras, and camera devices such as monitors and PC lenses, vehicle-mounted lenses.

BACKGROUND

In recent years, with the popularity of various smart devices, the demand for a miniaturized camera optical lens has gradually increased. Moreover, since the pixel size of the optical sensor is reduced, and the current electronic product has a light-thin and portable development trend, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the optical sensor is continuously reduced and the requirements on the imaging quality of the system are continuously improved, the six-lens structure gradually appears in the lens design. There is an urgent need for a wide-angle camera lens having excellent optical characteristics such as large aperture, wide-angle, ultra-thinness and sufficiently corrected aberration.

SUMMARY

In view of the above problems, an object of the present disclosure is to provide a camera optical lens, which has good optical performance and meets design requirements of sufficient aberration correction, large aperture, wide-angle and ultra-thinness.

In order to realize the above object, the technical solution of the present disclosure provides a camera optical lens sequentially includes six lenses from an object side to an image side: a first lens having negative refractive power, a second lens having positive refractive power, a third lens having positive refractive power, a fourth lens having negative refractive power, and a fifth lens having positive refractive power, and a sixth lens having negative refractive power. A focal length of the camera optical lens is f, a focal length of the second lens is f2, a focal length of the fourth lens is f4, an on-axis thickness of the first lens is d1, an on-axis thickness of the second lens is d3, an on-axis distance from an image side surface of the first lens to an object side surface of the second lens is d2, a central curvature radius of an object side surface of the first lens in a paraxial region is R1, a central curvature radius of an image side surface of the first lens in the paraxial region is R2, a central curvature radius of an image side surface of the third lens in the paraxial region is R6, and a central curvature radius of an object side surface of the fourth lens in the paraxial region is R7, and following relational expressions are satisfied:

$$7.00 \le (f2 - f4)/f \le 10.00;$$

$$2.50 \le (d1 + d3)/d2 \le 4.50;$$

$$-0.70 \le R1/R2 \le -0.20; \text{ and}$$

$$-5.00 \le R7/R6 \le -1.50.$$

As an improvement, an on-axis distance from an intersection point of an image side surface of the fifth lens and the optical axis to a vertex of an effective radius of the image side surface of the fifth lens is SAG52; and an effective radius of the image side surface of the fifth lens is SD52, and a following relational expression is satisfied:

$$0.45 \le |SAG52/SD52| \le 0.70.$$

As an improvement, a field of view of the camera optical lens in a 1.0 field of view is FOV; and an image height of the camera optical lens in the 1.0 field of view is IH, and a following relational expression is satisfied:

$$65.00 \le FOV * f/IH \le 85.00.$$

As an improvement, an object side surface of the first lens is concave in a paraxial region, and an image side surface of the first lens is concave in the paraxial region;

a focal length of the first lens is f1, and a total optical length from an object side surface of the first lens to an image plane of the camera optical lens along an optic axis is TTL, and following relational expressions are satisfied:

$$-3.77 \le f1/f \le -1.05;$$

$$-1.33 \le (R1 + R2)/(R1 - R2) \le -0.17; \text{ and}$$

$$0.03 \le d1/TTL \le 0.14.$$

As an improvement, an object side surface of the second lens is convex in a paraxial region, and an image side surface of the second lens is concave in the paraxial region;

a central curvature radius of an object side surface of the second lens in a paraxial region is R3, a central curvature radius of an image side surface of the second lens in the paraxial region is R4, and a total optical length from the object side surface of the first lens to an image plane of the camera optical lens along an optic axis is TTL, and following relational expressions are satisfied:

$$1.90 \le f2/f \le 9.81;$$

$$-14.41 \le (R3 + R4)/(R3 - R4) \le -2.69; \text{ and}$$

$$0.04 \le d3/TTL \le 0.15.$$

As an improvement, an object side surface of the third lens is convex in a paraxial region, and an image side surface of the third lens is convex in the paraxial region;

a focal length of the third lens is f3, a central curvature radius of the object side surface of the third lens in a paraxial region is R5, an on-axis thickness of the third lens is d5, and a total optical length from the object side surface of the first lens to an image plane of the along an optic axis of the camera optical lens is TTL, and following relational expressions are satisfied:

$$0.58 \le f3/f \le 2.02;$$

$$-0.19 \le (R5+R6)/(R5-R6) \le 0.29; \text{ and}$$

$$0.06 \le d5/TTL \le 0.19.$$

As an improvement, an object side surface of the fourth lens is convex in a paraxial region, and an image side surface of the fourth lens is concave in the paraxial region;

a central curvature radius of the image side surface of the fourth lens in a paraxial region is R8, an on-axis thickness of the fourth lens is d7, and a total optical length from the object side surface of the first lens to an image plane of the camera optical lens along an optic axis is TTL, and following relational expressions are satisfied:

$$-9.04 \le f4/f \le -2.14;$$

$$0.89 \le (R7+R8)/(R7-R8) \le 4.97; \text{ and}$$

$$0.03 \le d7/TTL \le 0.10.$$

As an improvement, an object side surface of the fifth lens is concave in a paraxial region, and an image side surface of the fifth lens is convex in the paraxial region;

a focal length of the fifth lens is f5, a central curvature radius of the object side surface of the fifth lens in a paraxial region is R9, a central curvature radius of the image side surface of the fifth lens in the paraxial region is R10, an on-axis thickness of the fifth lens is d9, and a total optical length from an object side surface of the first lens to an image plane of the camera optical lens along an optic axis is TTL, and following relational expressions are satisfied:

$$0.33 \le f5/f \le 1.28;$$

$$0.64 \le (R9+R10)/(R9-R10) \le 2.00; \text{ and}$$

$$0.09 \le d9/TTL \le 0.31.$$

As an improvement, an object side surface of the sixth lens is convex in a paraxial region, and an image side surface of the sixth lens is concave in the paraxial region;

a focal length of the sixth lens is f6, a central curvature radius of the object side surface of the sixth lens in a paraxial region is R11, a central curvature radius of the image side surface of the sixth lens in the paraxial region is R12, an on-axis thickness of the sixth lens is d11, and a total optical length from the object side surface of the first lens to an image plane of the camera optical lens along an optic axis is TTL, following relational expressions are satisfied:

$$-2.56 \le f6/f \le -0.62;$$

$$1.12 \le (R11+R12)/(R11-R12) \le 3.85; \text{ and}$$

$$0.04 \le d11/TTL \le 0.13.$$

As an improvement, an aperture of the camera optical lens is FNO, and a following relational expression is satisfied: $FNO \le 1.91$.

The present disclosure has the following beneficial effects: the camera optical lens according to the present disclosure has excellent optical characteristics of sufficient aberration correction, large aperture, wide-angle and ultra-thinness, and is particularly suitable for a mobile phone camera lens assembly and a WEB camera lens which are composed of camera elements such as CCD, CMOS with high resolution and a vehicle-mounted lens.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
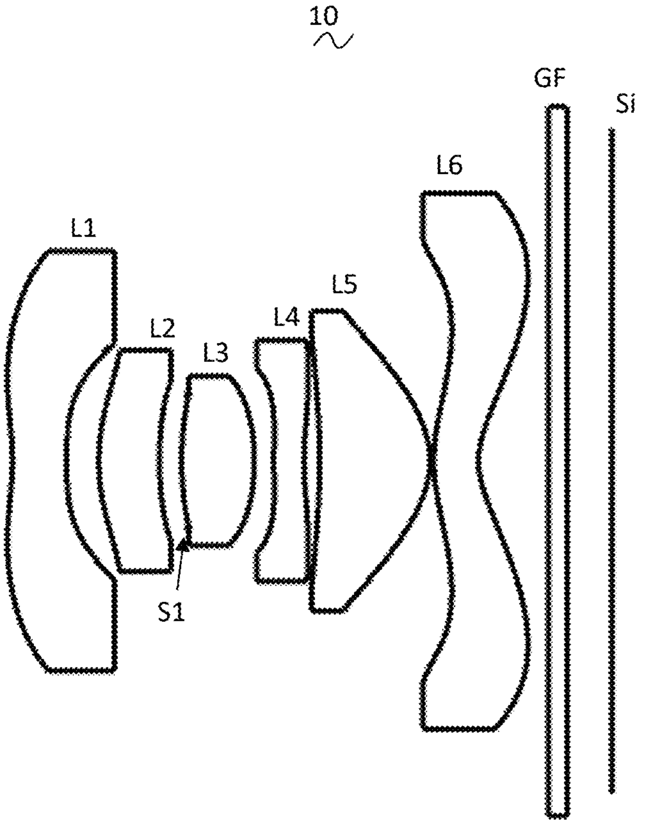
FIG. 1 is a structural schematic diagram of a camera optical lens according to Example 1 of the present disclosure.

In order to more clearly illustrate objectives, technical solutions, and advantages of the embodiments of the present disclosure, the technical solutions in the embodiments of the present disclosure are clearly and completely described in details with reference to the drawings. However, those of ordinary skill in the art will appreciate that in various embodiments of the present disclosure, numerous technical details are set forth for the reader to better understand the present disclosure. However, even without these technical details and various variations and modifications based on the following embodiments, the technical solutions claimed in the present disclosure can still be implemented.

Referring to FIGS. 1-16, the technical solution of the present disclosure provides camera optical lenses 10, 20, 30, 40. FIG. 1, FIG. 5, FIG. 9, and FIG. 13 show camera optical lenses 10, 20, 30, 40 according to the present disclosure, and the camera optical lenses 10, 20, 30, 40 include six lenses. The camera optical lens sequentially includes from an object side to an image side: a first lens L1, a second lens L2, an aperture S1, a third lens L3, a fourth lens L4, a fifth lens L5, and a sixth lens L6. An optical element such as a grating filter GF may be provided between the sixth lens L6 and the image plane Si.

The first lens L, the second lens L2, the third lens L3, the fourth lens L4, the fifth lens L5, and the sixth lens L6 are all made of plastic materials. The lenses may also be made of other materials.

The focal length of the camera optical lens is defined as f, a focal length of the second lens L2 is defined as f2, and a following relational expression is satisfied: $7.00 \le (f2-f4)/f \le 10.00$. Within the above range of the relational expression, it is beneficial to correct astigmatism and distortion of the camera optical lens by reasonably distributing the optical focal length of the optical system, so that distortion |Distortion|≤10%, thereby reducing the possibility of vignetting generation.

An on-axis thickness of the first lens L1 is defined as d1, an on-axis thickness of the second lens L2 is defined as d3, and an on-axis distance from an image side surface of the first lens L1 to an object side surface of the second lens L2 is defined as d2, and a following relational expression is satisfied: $2.50 \le (d1+d3)/d2 \le 4.50$. Within the above range of the relational expression, it is beneficial to reduce the assembly difficulty in the actual production process and improve the yield by reasonably distributing the air gap between the lenses.

A central curvature radius of the object side surface of the first lens L1 in a paraxial region is defined as R1, a central curvature radius of the image side surface of the first lens L1 in the paraxial region is defined as R2, and a following relational expression is satisfied: $-0.70 \le R1/R2 \le -0.20$. It defines a shape of the first lens L1, within the above range of the relational expression, the degree of deflection of light passing through the lens may be alleviated, the chromatic aberration is effectively corrected, and the chromatic aberration |LC|≤6.0 m.

A central curvature radius of the image side surface of the third lens L3 in a paraxial region is defined as R6, a central curvature radius of the object side surface of the fourth lens L4 in the paraxial region is defined as R7, and a following relational expression is satisfied: $-5.00 \le R7/R6 \le -1.50$. Within the above range of the relational expression, it defines the current situation of the image side surface of the third lens L3 and the object side surface of the fourth lens L4, it helps for the smooth transition of nearby light, and it is beneficial to improve image quality.

When the above relational expression is satisfied, the camera optical lenses 10, 20, 30, 40 have good optical performance and may satisfy the design requirements of large aperture, wide-angle and ultra-thinness; according to the characteristics of the camera optical lenses 10, 20, 30, 40, the camera optical lenses 10, 20, 30, 40 are particularly suitable for mobile phone camera lens assemblies and WEB camera lenses composed of camera elements such as CCD and CMOS with high resolution.

Based on the above relational expressions and the achievable functions, the characteristics of each lens are further refined as follows.

An on-axis distance from an intersection point of an image side surface of the fifth lens L5 and the optical axis to a vertex of an effective radius of the image side surface of the fifth lens L5 is SAG52; and an effective radius of the image side surface of the fifth lens is SD52, and a following relational expression is satisfied: $0.45 \le |SAG52/SD52| \le 0.70$. Within the above range of the relational expression, the camera optical lens has good stray light performance and is easy to process.

Afield of view of the camera optical lens in a 1.0 field of view is FOV; and an image height of the camera optical lens in the 1.0 field of view is IH, and a following relational expression is satisfied: $65.00 \le FOV*f/IH \le 85.00$. Within the above range of the relational expression, it is beneficial for wide-angle imaging of a larger image plane.

An object side surface of the first lens L1 is concave in a paraxial region, an image side surface of the first lens L1 is concave in the paraxial region, and the first lens L1 has negative refractive power. The object side surface and the image side surface of the first lens L1 may also be provided with other concave and convex distributions.

A focal length of the first lens L1 is f1, and a following relational expression is satisfied: $-3.77 \le f1/f \le -1.05$. It defines a ratio of negative refractive power of the first lens L1 to an overall focal length, within the above range of the relational expression, the first lens has a proper negative refractive power, which is beneficial to reducing system aberration, while it is beneficial to development of the lens assembly to ultra-thinness and wide-angle. Optionally, a following relational expression is satisfied: $-2.35 \le f1/f \le -1.31$.

A central curvature radius R1 of the object side surface of the first lens L1 in a paraxial region and a central curvature radius R2 of the image side surface of the first lens L1 in the paraxial region satisfy the following relational expression: $-1.33 \le (R1+R2)/(R1-R2) \le -0.17$. Within the above range of the relational expression, the shape of the first lens L1 is reasonably controlled, so that the first lens L1 may effectively correct the spherical aberration of the system. Optionally, a following relational expression is satisfied: $-0.83 \le (R1+R2)/(R1-R2) \le -0.21$.

The total optical length from the object side surface of the first lens to an image plane of the camera optical lens along an optic axis is TTL, and a following relational expression is satisfied: $0.03 \le d1/TTL \le 0.14$. Within the above range of the relational expression, it is beneficial to achieve miniaturization. Optionally, a following relational expression is satisfied: 0.05≤d1/TTL≤0.11.

An object side surface of the second lens L2 is convex in a paraxial region, an image side surface of the second lens L2 is concave in the paraxial region, and the second lens L2 has positive refractive power. The object side surface and the image side surface of the second lens L2 may also be provided with other concave and convex distributions.

A focal length of the second lens L2 is defined as f2, and a following relational expression is satisfied: 1.90≤f2/f≤9.81. It is beneficial to correct the aberration of the optical system by controlling the positive refractive power of the second lens L2 within a reasonable range. Optionally, a following relational expression is satisfied: 3.04≤f2/f≤7.85.

A central curvature radius of the object side surface of the second lens L2 in a paraxial region is R3, a central curvature radius of the image side surface of the second lens L2 in the paraxial region is R4, and the relational expression is satisfied: −14.41≤(R3+R4)/(R3−R4)≤−2.69. It defines the shape of the second lens L2, within the above range of the relational expression, it is beneficial to correct problems such as on-axis chromatic aberration with development of ultra-thinness and wide-angle lenses. Optionally, a following relational expression is satisfied: −9.01≤(R3+R4)/(R3−R4)≤−3.37.

The on-axis thickness d3 of the second lens L2 and the total optical length TTL of the camera optical lens satisfy the following relational expression: 0.04≤d3/TTL≤0.15. Within the above range of the relational expression, it is beneficial to achieve miniaturization. Optionally, a following relational expression is satisfied: 0.06≤d3/TTL≤0.12.

An object side surface of the third lens L3 is convex in a paraxial region, an image side surface of the third lens L3 is convex in the paraxial region, and the third lens L3 has positive refractive power. The object side surface and the image side surface of the third lens L3 may also be provided with other concave and convex distributions.

A focal length of the third lens L3 is defined as f3, and a following relational expression is satisfied: 0.58≤f3/f≤2.02. The system has better imaging quality and lower sensitivity by reasonable distributing the refractive power. Optionally, a following relational expression is satisfied: 0.92≤f3/f≤1.61.

A central curvature radius of the object side surface of the third lens L3 in a paraxial region is defined as R5, a central curvature radius of the image side surface of the third lens L3 in the paraxial region is defined as R6, and a following relational expression is satisfied: −0.19≤(R5+R6)/(R5−R6)≤0.29. Within the above range of the relational expression, the shape of the third lens L3 may be effectively controlled, and it is beneficial for molding of the third lens L3, and molding defects and stress generation caused by excessive surface curvature of the third lens L3 are avoided. Optionally, a following relational expression is satisfied: −

$$0.12 \le (R5+R6)/(R5-R6) \le 0.23.$$

An on-axis thickness of the third lens L3 is d5, and a following relational expression is satisfied: 0.06≤d5/TTL≤0.19. Within the above range of the relational expression, it is beneficial to achieve miniaturization. Optionally, a following relational expression is satisfied:

$$0.09 \le d5/TTL \le 0.15.$$

An object side surface of the fourth lens L4 is convex in a paraxial region, an image side surface of the fourth lens L4 is concave in the paraxial region, and the fourth lens L4 has negative refractive power. The object side surface of the fourth lens L4 may also be provided with other concave and convex distributions.

A focal length f4 of the fourth lens L4 and the focal length f of the camera optical lens satisfy the following relational expressions: −9.04≤f4/f≤−2.14. The system has better imaging quality and lower sensitivity by reasonable distributing the refractive power. Optionally, a following relational expression is satisfied: −5.65≤f4/f≤−2.67.

A central curvature radius of the image side surface of the fourth lens L4 in a paraxial region is R8, and a following relational expression is satisfied: 0.89≤(R7+R8)/(R7−R8)≤4.97. It defines the shape of the fourth lens L4, within the above range of the relational expression, it is beneficial to correct the aberration of off-axis chromatic angles with the development of ultra-thinness and wide-angle. Optionally, a following relational expression is satisfied:

$$1.42 \le (R7+R8)/(R7-R8) \le 3.97.$$

An on-axis thickness of the fourth lens L4 is d7, and a following relational expression is satisfied: 0.03≤d7/TTL≤0.10. Within the above range of the relational expression, it is beneficial to achieve miniaturization. Optionally, a following relational expression is satisfied: 0.04≤d7/TTL≤0.08.

An object side surface of the fifth lens L5 is concave in a paraxial region, an image side surface of the fifth lens L5 is convex in the paraxial region, and the fifth lens L5 has positive refractive power. The object side surface and the image side surface of the fifth lens L5 may also be provided with other concave and convex distributions.

A focal length of the fifth lens L5 is f5, and a following relational expression is satisfied: 0.33≤f5/f≤1.28. The limitation of the fifth lens L5 may effectively make a light angle of the camera optical lens smooth, and reduce tolerance sensitivity. Optionally, a following relational expression is satisfied: 0.53≤f5/f≤1.02.

A central curvature radius of the object side surface of the fifth lens L5 in a paraxial region is R9, a central curvature radius of the image side surface of the fifth lens L5 in the paraxial region is R10, and a following relational expression is satisfied: 0.64≤(R9+R10)/(R9−R10)≤2.00. It defines the shape of the fifth lens L5, within the above range of the relational expression, it is beneficial to correct the aberration of off-axis chromatic angles with the development of ultra-thinness and wide-angle. Optionally, a following relational expression is satisfied: 1.02≤(R9+R10)/(R9−R10)≤1.60.

An on-axis thickness of the fifth lens L5 is d9, and a following relational expression is satisfied: 0.09≤d9/TTL≤0.31. Within the above range of the relational expression, it is beneficial to achieve miniaturization. Optionally, a following relational expression is satisfied:

$$0.15 \le d9/TTL \le 0.25.$$

A focal length of the sixth lens L6 is f6, and a following relational expression is satisfied: $-2.56 \le f6/f \le -0.62$, the system has better imaging quality and lower sensitivity by reasonable distributing the refractive power. Optionally, a following relational expression is satisfied: $-1.60 \le f6/f \le -0.78$.

A central curvature radius of the object side surface of the sixth lens L6 in a paraxial region is R11, a central curvature radius of the image side surface of the sixth lens L6 in the paraxial region is R12, and a following relational expression is satisfied: $1.12 \le (R11+R12)/(R11-R12) \le 3.85$. It defines the shape of the sixth lens L6, within the above range of the relational expression, it is beneficial to correct the aberration of off-axis chromatic angle and other problems with the development of ultra-thinness and wide-angle. Optionally, a following relational expression is satisfied: $1.80 \le (R11+R12)/(R11-R12) \le 3.08$.

An on-axis thickness of the sixth lens L6 is d11, and a following relational expression is satisfied: $0.04 \le d11/TTL \le 0.13$. Within the above range of the relational expression, it is beneficial to achieve miniaturization. Optionally, a following relational expression is satisfied: $0.06 \le d11/TTL \le 0.10$.

An aperture value FNO of the camera optical lens is less than or equal to 1.91, thereby achieving a large aperture and good imaging performance of the camera optical lens.

The camera optical lens of the present disclosure will be described below with embodiments. The reference signs recited in each embodiment are shown below. The units of focal length, on-axis distance, central curvature radius and on-axis thickness are mm.

TTL: a total optical length (on-axis distance from the object side surface of the first lens to an image plane Si of the camera optical lens along an optic axis) is in mm;

Aperture value FNO refers to the ratio of the effective focal length of the camera optical lens to the entrance pupil diameter of the camera optical lens.

The technical solutions of the present disclosure will be described in detail in four examples and one Comparative Example.

Example 1

Table 1 and Table 2 show design data of the camera optical lens 10 according to Example 1 of the present disclosure.

TABLE 1

| | R | | d | | nd | | vd |
|---|---|---|---|---|---|---|---|
| S1 | ∞ | d0= | −1.972 | | | | |
| R1 | −2.678 | d1= | 0.608 | nd1 | 1.5444 | v1 | 55.82 |
| R2 | 8.028 | d2= | 0.361 | | | | |
| R3 | 2.396 | d3= | 0.679 | nd2 | 1.6153 | v2 | 25.94 |
| R4 | 3.716 | d4= | 0.250 | | | | |
| R5 | 3.639 | d5= | 0.815 | nd3 | 1.5444 | v3 | 55.82 |
| R6 | −2.579 | d6= | 0.219 | | | | |
| R7 | 7.028 | d7= | 0.338 | nd4 | 1.6700 | v4 | 19.39 |
| R8 | 3.336 | d8= | 0.177 | | | | |
| R9 | −6.459 | d9= | 1.238 | nd5 | 1.5444 | v5 | 55.82 |
| R10 | −0.928 | d10= | 0.040 | | | | |
| R11 | 1.837 | d11= | 0.500 | nd6 | 1.6400 | v6 | 23.54 |
| R12 | 0.807 | d12= | 0.785 | | | | |
| R13 | ∞ | d13= | 0.210 | ndg | 1.5168 | vg | 64.17 |
| R14 | ∞ | d14= | 0.505 | | | | |

The meaning of each reference sign is as follows.

S1: aperture;

R: curvature radius at the center of the optical surface;

R1: central curvature radius of the object side surface of the first lens L1 in the paraxial region;

R2: central curvature radius of the image side surface of the first lens L1 in the paraxial region;

R3: central curvature radius of the object side surface of the second lens L2 in the paraxial region;

R4: central curvature radius of the image side surface of the second lens L2 in the paraxial region;

R5: central curvature radius of the object side surface of the third lens L3 in the paraxial region;

R6: central curvature radius of the image side surface of the third lens L3 in the paraxial region;

R7: central curvature radius of the object side surface of the fourth lens L4 in the paraxial region;

R8: central curvature radius of the image side surface of the fourth lens L4 in the paraxial region;

R9: central curvature radius of the object side surface of the fifth lens L5 in the paraxial region;

R10: central curvature radius of the image side surface of the fifth lens L5 in the paraxial region;

R11: central curvature radius of the object side surface of the sixth lens L6 in the paraxial region;

R12: central curvature radius of the image side surface of the sixth lens L6 in the paraxial region;

R13: central curvature radius of the object side surface of the grating filter GF in the paraxial region;

R14: central curvature radius of the image side surface of the grating filter GF in the paraxial region;

d: on-axis thickness of lenses, on-axis distance between lenses;

d0: on-axis distance from aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the grating filter GF;

d13: on-axis thickness of the grating filter GF;

d14: on-axis distance from the image side surface of the grating filter GF to the image plane Si;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the grating filter GF.

Table 2 shows aspherical surface data of each lens in the camera optical lens 10 according to Example 1 of the present disclosure.

TABLE 2

| | Conic Coefficient | Aspherical Coefficient | | | | |
|---|---|---|---|---|---|---|
| | k | A4 | A6 | A8 | A10 | A12 |
| R1 | −2.61913E+01 | 1.10770E−01 | −7.23850E−02 | 3.93450E−02 | −1.64190E−02 | 5.04800E−03 |
| R2 | −4.34278E+01 | 3.75870E−01 | −3.77980E−01 | 4.37590E−01 | −4.42710E−01 | 2.93490E−01 |
| R3 | −1.71440E+00 | 5.66550E−02 | −1.24650E−01 | 3.17190E−02 | 1.85190E−01 | −4.38980E−01 |
| R4 | 3.84839E+00 | 4.35090E−02 | −8.10010E−01 | 9.77100E+00 | −7.24050E+01 | 3.43980E+02 |
| R5 | −9.64641E−01 | 1.06030E−02 | 1.15800E−01 | −1.34810E+00 | 1.01250E+01 | −5.67330E+01 |
| R6 | 1.66949E−01 | −1.46450E−01 | −2.52730E−01 | 5.50510E+00 | −5.42220E+01 | 3.67040E+02 |
| R7 | 2.44099E+01 | −3.73710E−01 | 1.35820E+00 | −1.75570E+01 | 1.53880E+02 | −8.90380E+02 |
| R8 | 1.02887E+00 | −1.63490E−01 | 8.59470E−02 | −1.45780E+00 | 1.13930E+01 | −4.63870E+01 |
| R9 | 5.64381E+00 | 5.98330E−02 | 2.19770E−01 | −3.52370E+00 | 1.94870E+01 | −6.39100E+01 |
| R10 | −1.08542E+00 | 2.62160E−01 | −5.01390E−01 | 1.23630E+00 | −3.05250E+00 | 5.86680E+00 |
| R11 | −1.20291E+00 | −2.14130E−01 | 2.42430E−01 | −2.75980E−01 | 2.29440E−01 | −1.31410E−01 |
| R12 | −4.45916E+00 | −5.98990E−02 | 6.64150E−02 | −7.75040E−02 | 6.44090E−02 | −3.76410E−02 |

| | Conic Coefficient | Aspherical Coefficient | | | | |
|---|---|---|---|---|---|---|
| | k | A14 | A16 | A18 | A20 | A22 |
| R1 | −2.61913E+01 | −1.08360E−03 | 1.51870E−04 | −1.23830E−05 | 4.42930E−07 | 0.00000E+00 |
| R2 | −4.34278E+01 | −7.93500E−02 | −3.12920E−02 | 2.85670E−02 | −5.90950E−03 | 0.00000E+00 |
| R3 | −1.71440E+00 | 4.87640E−01 | −2.95120E−01 | 9.40120E−02 | −1.24690E−02 | 0.00000E+00 |
| R4 | 3.84839E+00 | −1.08110E+03 | 2.27590E+03 | −3.17250E+03 | 2.80790E+03 | −1.42800E+03 |
| R5 | −9.64641E−01 | 2.12890E+02 | −4.53870E+02 | 2.46830E+02 | 1.22770E+03 | −3.23460E+03 |
| R6 | 1.66949E−01 | −1.78070E+03 | 6.23240E+03 | −1.57570E+04 | 2.86650E+04 | −3.70490E+04 |
| R7 | 2.44099E+01 | 3.55800E+03 | −1.01020E+04 | 2.06700E+04 | −3.05530E+04 | 3.23030E+04 |
| R8 | 1.02887E+00 | 1.20250E+02 | −2.13280E+02 | 2.66970E+02 | −2.38300E+02 | 1.50860E+02 |
| R9 | 5.64381E+00 | 1.39680E+02 | −2.13280E+02 | 2.32510E+02 | −1.82150E+02 | 1.01790E+02 |
| R10 | −1.08542E+00 | −8.13310E+00 | 8.07020E+00 | −5.74990E+00 | 2.93680E+00 | −1.06240E+00 |
| R11 | −1.20291E+00 | 4.99500E−02 | −1.12300E−02 | 6.38690E−04 | 4.73950E−04 | −1.77950E−04 |
| R12 | −4.45916E+00 | 1.57600E−02 | −4.79510E−03 | 1.06670E−03 | −1.73120E−04 | 2.02380E−05 |

| | Conic Coefficient | Aspherical Coefficient | | | | |
|---|---|---|---|---|---|---|
| | k | A24 | A26 | A28 | A30 | / |
| R1 | −2.61913E+01 | 0.00000E+00 | 0.00000E+00 | 0.00000E+00 | 0.00000E+00 | / |
| R2 | −4.34278E+01 | 0.00000E+00 | 0.00000E+00 | 0.00000E+00 | 0.00000E+00 | / |
| R3 | −1.71440E+00 | 0.00000E+00 | 0.00000E+00 | 0.00000E+00 | 0.00000E+00 | / |
| R4 | 3.84839E+00 | 3.17580E+02 | 0.00000E+00 | 0.00000E+00 | 0.00000E+00 | / |
| R5 | −9.64641E−01 | 3.28100E+03 | −1.26160E+03 | 0.00000E+00 | 0.00000E+00 | / |
| R6 | 1.66949E−01 | 3.31190E+04 | −1.94350E+04 | 6.72730E+03 | −1.04000E+03 | / |
| R7 | 2.44099E+01 | −2.38080E+04 | 1.16100E+04 | −3.36540E+03 | 4.38830E+02 | / |
| R8 | 1.02887E+00 | −6.61960E+01 | 1.91420E+01 | −3.28090E+00 | 2.52450E−01 | / |
| R9 | 5.64381E+00 | −3.95950E+01 | 1.01870E+01 | −1.55810E+00 | 1.07240E−01 | / |
| R10 | −1.08542E+00 | 2.64670E−01 | −4.29650E−02 | 4.06400E−03 | −1.68360E−04 | / |
| R11 | −1.20291E+00 | 3.22190E−05 | −3.40590E−06 | 2.01480E−07 | −5.18080E−09 | / |
| R12 | −4.45916E+00 | −1.65750E−06 | 9.01890E−08 | −2.92660E−09 | 4.28490E−11 | / |

For convenience, the aspherical surface of each lens surface uses the aspherical surface shown in the following formula (1). However, the present disclosure is not limited to the aspherical polynomial form shown in formula (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20}+A22r^{22}+A24r^{24}+A26r^{26}+A28r^{28}+A30r^{30} \quad (1)$$

Where, k is a conic coefficient, A4, A6, A8, A10, A12, A14, A16, A18, A20, A22, A24, A26, A28 and A30 are aspherical coefficients, c is a curvature at a center of an optical surface, r is a vertical distance between a point on an aspherical curve and an optical axis, and z is an aspherical depth (a vertical distance between a point on the aspherical surface having a distance r from the optical axis, and a tangent plane tangent to a vertex on the aspherical optical axis).

Figure 2:
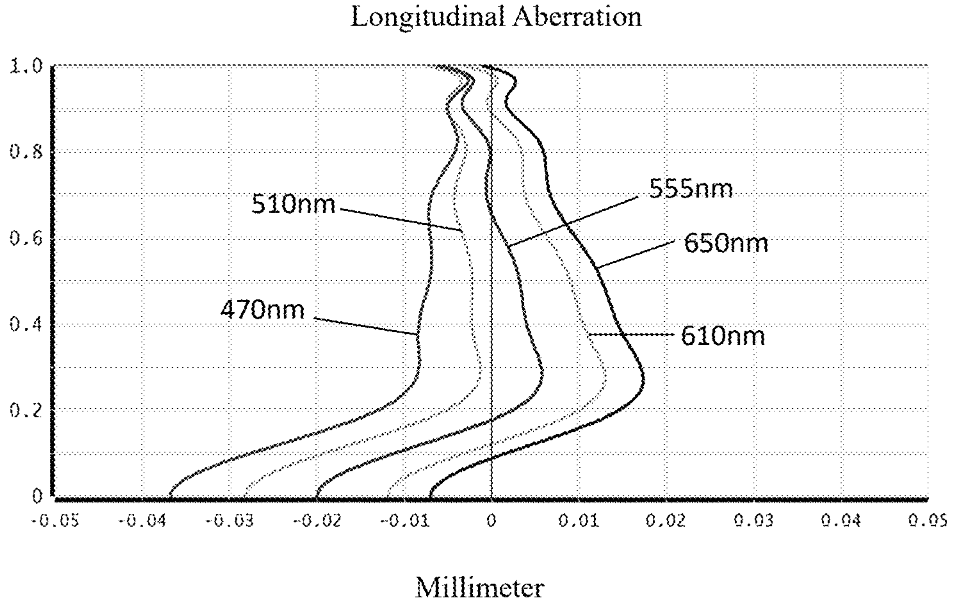
FIG. 2 is a schematic diagram of longitudinal aberration of the camera optical lens shown in FIG. 1.
Figure 3:
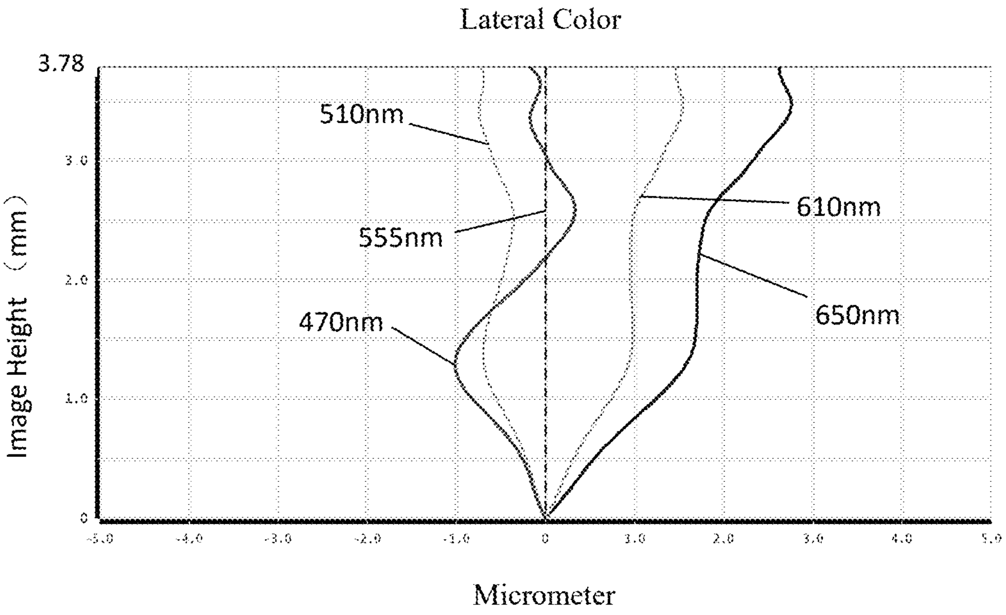
FIG. 3 is a schematic diagram of lateral color of the camera optical lens shown in FIG. 1.
Figure 4:
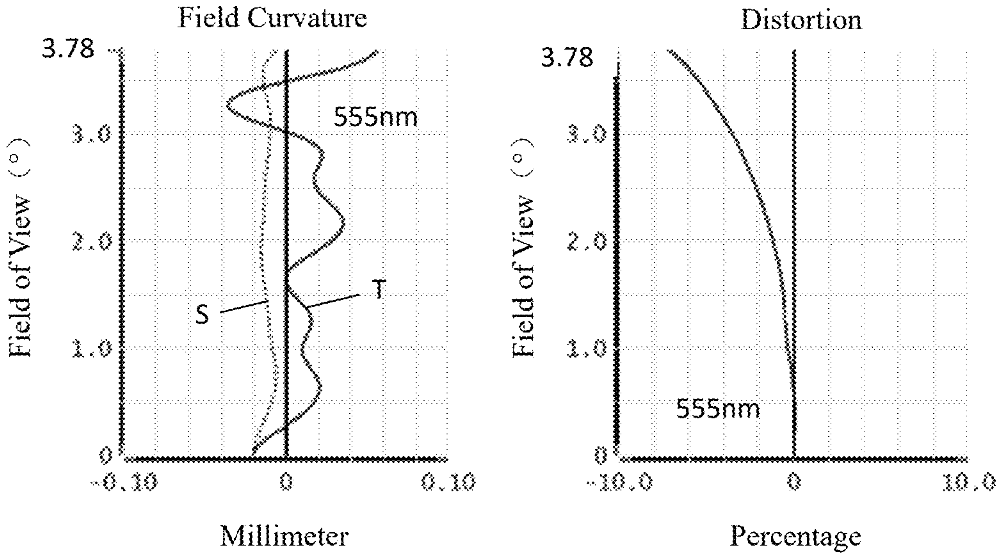
FIG. 4 is a schematic diagram of field curvature and distortion of the camera optical lens shown in FIG. 1.

FIG. 2 and FIG. 3 respectively show longitudinal aberration and lateral color of light with wavelengths of 650 nm, 610 nm, 555 nm, 510 nm, and 470 nm after passing through the camera optical lens 10 according to Example 1. FIG. 4 shows field curvature and distortion of light with a wavelength of 555 nm after passing through the camera optical lens 10 according to Example 1, the field curvature S in FIG. 4 is a field curvature in the sagittal direction, and T is a field curvature in the meridian direction.

In this example, an entrance pupil diameter ENPD of the camera optical lens 10 is 1.165 mm, a full field of view (1.0 field of view) image height IH is 3.530 mm, and a field of view FOV in a diagonal direction of the full field of view (1.0 field of view) is 120.61°. The camera optical lens 10 meets the design requirements of large aperture, wide-angle and ultra-thinness, its on-axis and off-axis chromatic aberrations are fully corrected. The camera optical lens 10 has excellent optical characteristics.

It may be understood that the 1.0 field of view image height refers to half of the diagonal length of an effective pixel area of the sensor; the FOV in the diagonal direction of the 1.0 field of view refers to the field of view corresponding to the effective pixel area of the sensor.

Example 2

The meaning of the reference signs of Example 2 is the same as that of Example 1.

Figure 5:
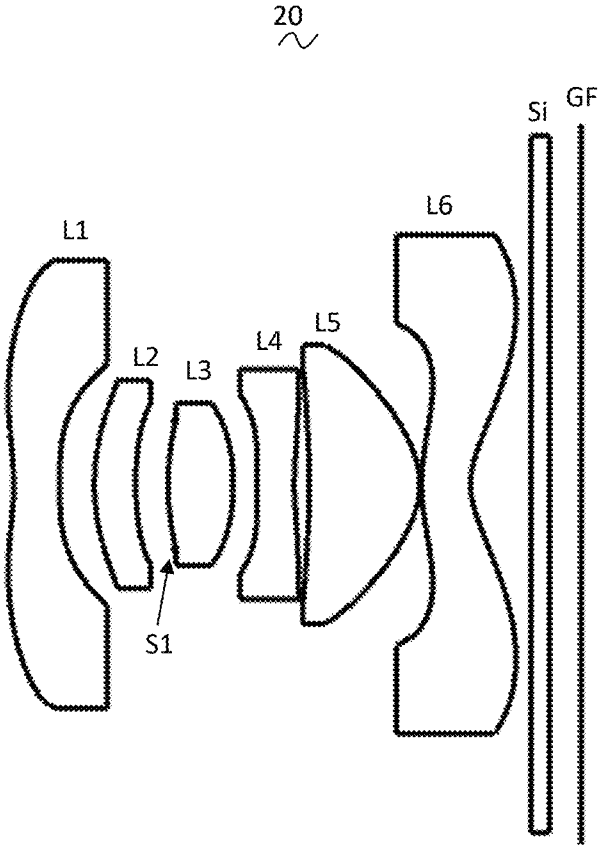
FIG. 5 is a structural schematic diagram of a camera optical lens according to Example 2 of the present disclosure.

FIG. 5 shows a camera optical lens 20 according to Example 2 of the present disclosure.

Table 3 and Table 4 show design data of the camera optical lens 20 according to Example 2 of the present disclosure.

TABLE 3

| | R | d | | nd | | vd | |
|---|---|---|---|---|---|---|---|
| S1 | ∞ | d0= | −1.868 | | | | |
| R1 | −2.592 | d1= | 0.532 | nd1 | 1.5444 | v1 | 55.82 |
| R2 | 12.816 | d2= | 0.402 | | | | |
| R3 | 2.586 | d3= | 0.478 | nd2 | 1.6153 | v2 | 25.94 |
| R4 | 3.473 | d4= | 0.375 | | | | |
| R5 | 2.981 | d5= | 0.756 | nd3 | 1.5444 | v3 | 55.82 |
| R6 | −2.449 | d6= | 0.273 | | | | |
| R7 | 12.240 | d7= | 0.432 | nd4 | 1.6700 | v4 | 19.39 |
| R8 | 3.416 | d8= | 0.174 | | | | |
| R9 | −7.334 | d9= | 1.280 | nd5 | 1.5444 | v5 | 55.82 |
| R10 | −0.876 | d10= | 0.020 | | | | |
| R11 | 2.021 | d11= | 0.565 | nd6 | 1.6400 | v6 | 23.54 |
| R12 | 0.776 | d12= | 0.704 | | | | |
| R13 | ∞ | d13= | 0.210 | ndg | 1.5168 | vg | 64.17 |
| R14 | ∞ | d14= | 0.371 | | | | |

Table 4 shows aspherical surface data of each lens in the camera optical lens 20 according to Example 2 of the present disclosure.

TABLE 4

| | Conic Coefficient | Aspherical Coefficient | | | | |
|---|---|---|---|---|---|---|
| | k | A4 | A6 | A8 | A10 | A12 |
| R1 | −2.47131E+01 | 1.04870E−01 | −7.20640E−02 | 3.93830E−02 | −1.64250E−02 | 5.04730E−03 |
| R2 | −3.37157E+02 | 3.68360E−01 | −3.79370E−01 | 4.39480E−01 | −4.41490E−01 | 2.93740E−01 |
| R3 | −5.42466E−01 | 6.65450E−02 | −1.08210E−01 | 3.26570E−02 | 1.83460E−01 | −4.41030E−01 |
| R4 | 8.62798E+00 | 5.32930E−02 | −8.03540E−01 | 9.76840E+00 | −7.24210E+01 | 3.43960E+02 |
| R5 | −9.72721E−02 | 5.39030E−03 | 1.04040E−01 | −1.49250E+00 | 1.10330E+01 | −5.82070E+01 |
| R6 | −9.02694E−02 | −1.42930E−01 | −2.58620E−01 | 5.52000E+00 | −5.42000E+01 | 3.67050E+02 |
| R7 | 2.53949E+01 | −3.86260E−01 | 1.36080E+00 | −1.75430E+01 | 1.53890E+02 | −8.90370E+02 |
| R8 | 6.45069E−01 | −1.65450E−01 | 8.81560E−02 | −1.45650E+00 | 1.13930E+01 | −4.63870E+01 |
| R9 | −3.36683E+00 | 6.29310E−02 | 2.16420E−01 | −3.52600E+00 | 1.94870E+01 | −6.39090E+01 |
| R10 | −1.12795E+00 | 2.58740E−01 | −5.04240E−01 | 1.23590E+00 | −3.05260E+00 | 5.86670E+00 |
| R11 | −1.22641E+00 | −2.18610E−01 | 2.36950E−01 | −2.75890E−01 | 2.29450E−01 | −1.31430E−01 |
| R12 | −4.42699E+00 | −6.39230E−02 | 6.68710E−02 | −7.75300E−02 | 6.44120E−02 | −3.76400E−02 |

| | Conic Coefficient | Aspherical Coefficient | | | | |
|---|---|---|---|---|---|---|
| | k | A14 | A16 | A18 | A20 | A22 |
| R1 | −2.47131E+01 | −1.08380E−03 | 1.51870E−04 | −1.23810E−05 | 4.43840E−07 | 0.00000E+00 |
| R2 | −3.37157E+02 | −7.90150E−02 | −3.14290E−02 | 2.84730E−02 | −5.90150E−03 | 0.00000E+00 |
| R3 | −5.42466E−01 | 4.87690E−01 | −2.93440E−01 | 9.40590E−02 | −1.34510E−02 | 0.00000E+00 |
| R4 | 8.62798E+00 | −1.08120E+03 | 2.27600E+03 | −3.17240E+03 | 2.80790E+03 | −1.42800E+03 |
| R5 | −9.72721E−02 | 2.12140E+02 | −4.49870E+02 | 2.44380E+02 | 1.22760E+03 | −3.23470E+03 |
| R6 | −9.02694E−02 | −1.78070E+03 | 6.23230E+03 | −1.57570E+04 | 2.86650E+04 | −3.70490E+04 |
| R7 | 2.53949E+01 | 3.55800E+03 | −1.01020E+04 | 2.06700E+04 | −3.05530E+04 | 3.23030E+04 |
| R8 | 6.45069E−01 | 1.20250E+02 | −2.13280E+02 | 2.66970E+02 | −2.38300E+02 | 1.50860E+02 |
| R9 | −3.36683E+00 | 1.39680E+02 | −2.13280E+02 | 2.32510E+02 | −1.82150E+02 | 1.01790E+02 |
| R10 | −1.12795E+00 | −8.13310E+00 | 8.07020E+00 | −5.74990E+00 | 2.93680E+00 | −1.06240E+00 |
| R11 | −1.22641E+00 | 4.99410E−02 | −1.12320E−02 | 6.38710E−04 | 4.73890E−04 | −1.77960E−04 |
| R12 | −4.42699E+00 | 1.57600E−02 | −4.79510E−03 | 1.06670E−03 | −1.73120E−04 | 2.02380E−05 |

| | Conic Coefficient | Aspherical Coefficient | | | | |
|---|---|---|---|---|---|---|
| | k | A24 | A26 | A28 | A30 | / |
| R1 | −2.47131E+01 | 0.00000E+00 | 0.00000E+00 | 0.00000E+00 | 0.00000E+00 | / |
| R2 | −3.37157E+02 | 0.00000E+00 | 0.00000E+00 | 0.00000E+00 | 0.00000E+00 | / |
| R3 | −5.42466E−01 | 0.00000E+00 | 0.00000E+00 | 0.00000E+00 | 0.00000E+00 | / |
| R4 | 8.62798E+00 | 3.17570E+02 | 0.00000E+00 | 0.00000E+00 | 0.00000E+00 | / |
| R5 | −9.72721E−02 | 3.28020E+03 | −1.26090E+03 | 0.00000E+00 | 0.00000E+00 | / |
| R6 | −9.02694E−02 | 3.31190E+04 | −1.94350E+04 | 6.72730E+03 | −1.04000E+03 | / |
| R7 | 2.53949E+01 | −2.38080E+04 | 1.16100E+04 | −3.36540E+03 | 4.38830E+02 | / |
| R8 | 6.45069E−01 | −6.61960E+01 | 1.91420E+01 | −3.28090E+00 | 2.52450E−01 | / |
| R9 | −3.36683E+00 | −3.95950E+01 | 1.01870E+01 | −1.55810E+00 | 1.07240E−01 | / |
| R10 | −1.12795E+00 | 2.64670E−01 | −4.29650E−02 | 4.06400E−03 | −1.68340E−04 | / |
| R11 | −1.22641E+00 | 3.22110E−05 | −3.40750E−06 | 2.01320E−07 | −5.17710E−09 | / |
| R12 | −4.42699E+00 | −1.65750E−06 | 9.01890E−08 | −2.92660E−09 | 4.28490E−11 | / |

Figure 6:
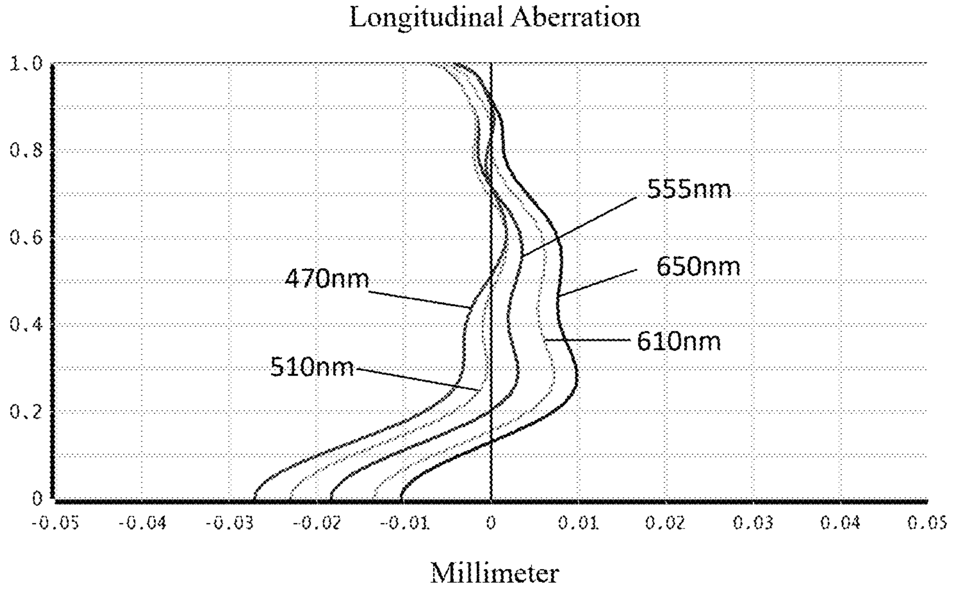
FIG. 6 is a schematic diagram of longitudinal aberration of the camera optical lens shown in FIG. 5.
Figure 7:
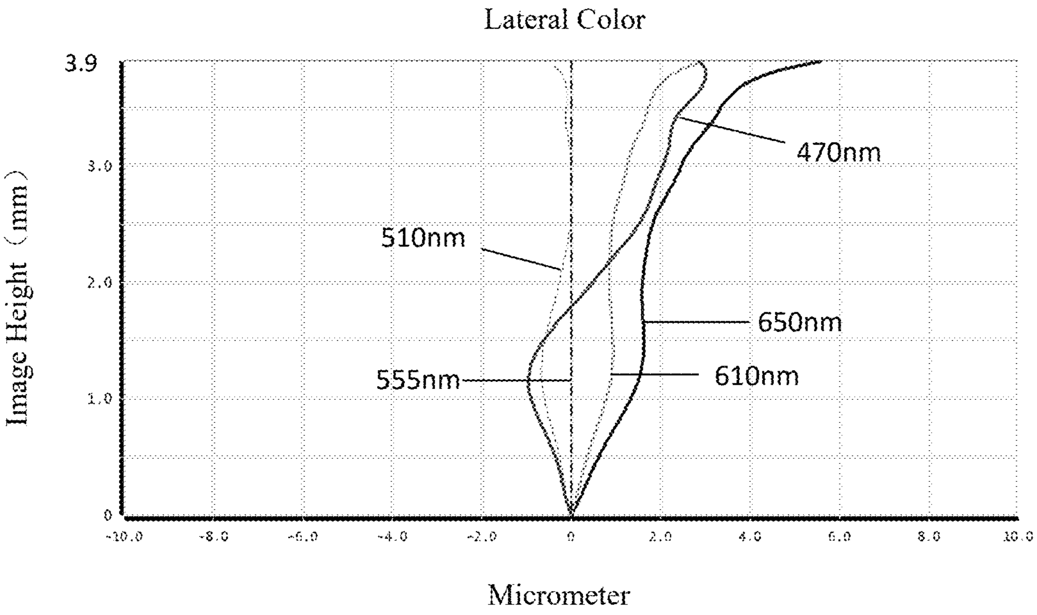
FIG. 7 is a schematic diagram of lateral color of the camera optical lens shown in FIG. 5.
Figure 8:
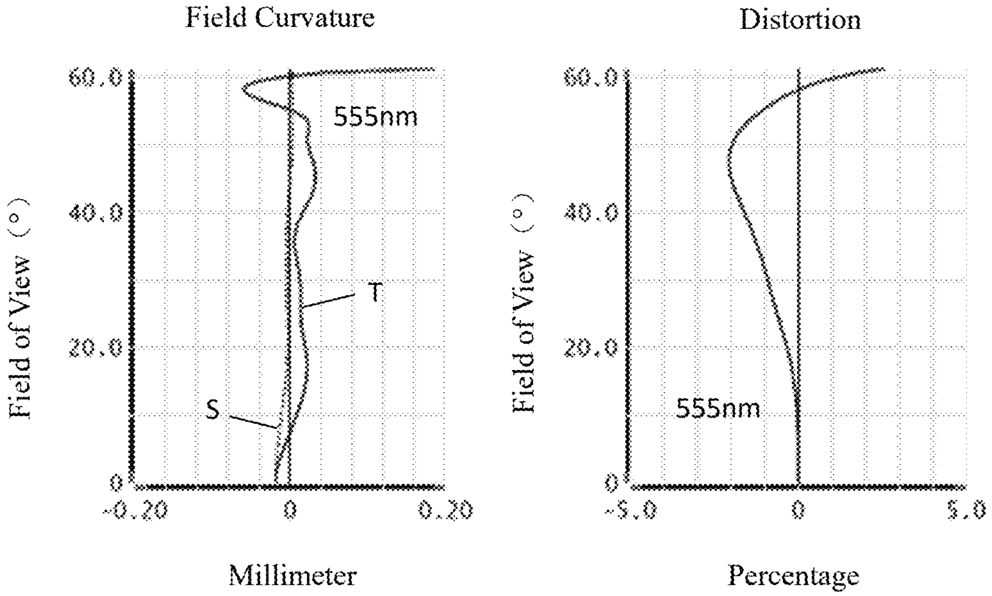
FIG. 8 is a schematic diagram of field curvature and distortion of the camera optical lens shown in FIG. 5.

FIG. 6 and FIG. 7 respectively show longitudinal aberration and lateral color of light with wavelengths of 650 nm, 610 nm, 555 nm, 510 nm, and 470 nm after passing through the camera optical lens 20 according to Example 2. FIG. 8 shows field curvature and distortion of light with a wavelength of 555 nm after passing through the camera optical lens 20 according to Example 2. The field curvature S in FIG. 8 is the field curvature in the sagittal direction, and T is the field curvature in the meridian direction.

In this example, the entrance pupil diameter ENPD of the camera optical lens 20 is 1.118 mm, the full field of view (1.0 field of view) image height IH is 3.900 mm, and the field of view FOV in the diagonal direction of the full field of view (1.0 field of view) is 122.58°; the camera optical lens 20 meets the design requirements of large aperture, wide-angle and ultra-thinness, and the on-axis and off-axis chromatic aberration thereof are fully corrected. The camera optical lens 20 has good optical characteristics.

Example 3

The meaning of the reference signs of Example 3 is the same as that of Example 1.

Figure 9:
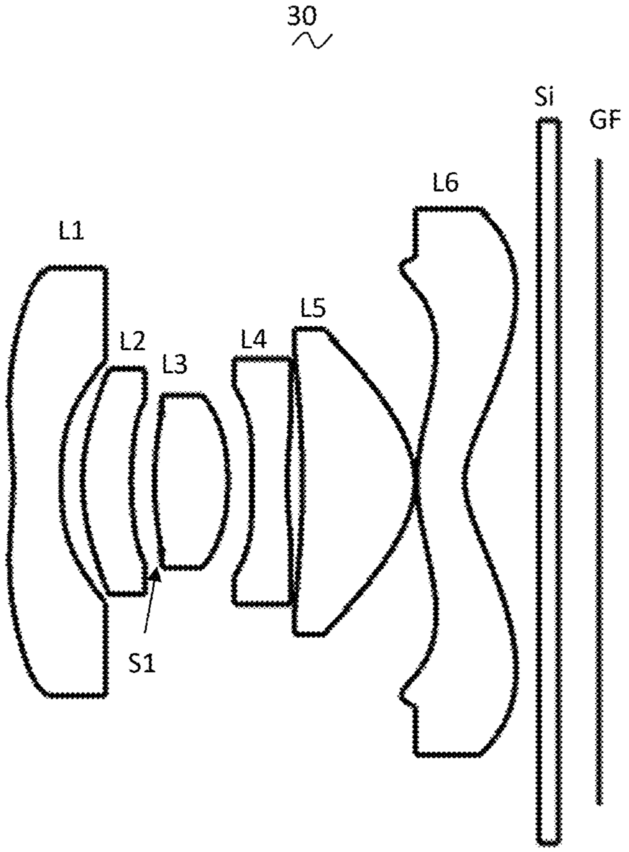
FIG. 9 is a structural schematic diagram of a camera optical lens according to Example 3 of the present disclosure.

FIG. 9 shows a camera optical lens 30 according to Example 3 of the present disclosure.

Table 5 and Table 6 show design data of the camera optical lens 30 according to the Example 3 of the present disclosure.

TABLE 5

| | R | d | | nd | | vd | |
|---|---|---|---|---|---|---|---|
| S1 | ∞ | d0= | −1.662 | | | | |
| R1 | −3.169 | d1= | 0.538 | nd1 | 1.5444 | v1 | 55.82 |
| R2 | 5.283 | d2= | 0.241 | | | | |
| R3 | 2.384 | d3= | 0.546 | nd2 | 1.6153 | v2 | 25.94 |
| R4 | 3.952 | d4= | 0.262 | | | | |
| R5 | 3.655 | d5= | 0.822 | nd3 | 1.5444 | v3 | 55.82 |
| R6 | −2.471 | d6= | 0.267 | | | | |
| R7 | 12.233 | d7= | 0.400 | nd4 | 1.6700 | v4 | 19.39 |
| R8 | 3.447 | d8= | 0.172 | | | | |
| R9 | −6.646 | d9= | 1.262 | nd5 | 1.5444 | v5 | 55.82 |
| R10 | −0.895 | d10= | 0.021 | | | | |
| R11 | 1.802 | d11= | 0.536 | nd6 | 1.6400 | v6 | 23.54 |
| R12 | 0.775 | d12= | 0.839 | | | | |
| R13 | ∞ | d13= | 0.210 | ndg | 1.5168 | vg | 64.17 |
| R14 | ∞ | d14= | 0.455 | | | | |

Table 6 shows aspherical surface data of each lens in the camera optical lens 30 according to Example 3 of the present disclosure.

TABLE 6

| | Conic Coefficient | Aspherical Coefficient | | | | |
|---|---|---|---|---|---|---|
| | k | A4 | A6 | A8 | A10 | A12 |
| R1 | −3.73247E+01 | 1.06030E−01 | −7.22200E−02 | 3.93650E−02 | −1.64200E−02 | 5.04500E−03 |
| R2 | −2.37068E+01 | 3.67560E−01 | −3.87030E−01 | 4.38370E−01 | −4.43600E−01 | 2.91960E−01 |
| R3 | −1.20954E+00 | 5.81640E−02 | −1.12600E−01 | 3.14200E−02 | 1.84390E−01 | −4.39670E−01 |
| R4 | 5.63067E+00 | 5.05570E−02 | −7.77060E−01 | 9.78770E+00 | −7.24190E+01 | 3.43970E+02 |
| R5 | −7.83391E−01 | 3.53270E−03 | 1.04780E−01 | −1.32250E+00 | 1.01270E+01 | −5.67340E+01 |
| R6 | 7.03698E−01 | −1.48210E−01 | −2.58200E−01 | 5.50490E+00 | −5.42200E+01 | 3.67070E+02 |
| R7 | 3.98745E+01 | −3.71850E−01 | 1.36320E+00 | −1.75530E+01 | 1.53900E+02 | −8.90370E+02 |
| R8 | 7.18290E−01 | −1.66120E−01 | 8.85000E−02 | −1.45750E+00 | 1.13930E+01 | −4.63870E+01 |
| R9 | 6.45781E+00 | 6.45730E−02 | 2.17080E−01 | −3.52420E+00 | 1.94870E+01 | −6.39090E+01 |
| R10 | −1.11044E+00 | 2.62110E−01 | −5.01910E−01 | 1.23600E+00 | −3.05220E+00 | 5.86680E+00 |
| R11 | −1.04293E+00 | −2.13170E−01 | 2.40770E−01 | −2.76000E−01 | 2.29440E−01 | −1.31410E−01 |
| R12 | −4.33714E+00 | −5.96830E−02 | 6.64280E−02 | −7.75320E−02 | 6.44120E−02 | −3.76410E−02 |

| | Conic Coefficient | Aspherical Coefficient | | | | |
|---|---|---|---|---|---|---|
| | k | A14 | A16 | A18 | A20 | A22 |
| R1 | −3.73247E+01 | −1.08430E−03 | 1.51780E−04 | −1.23630E−05 | 4.51450E−07 | 0.00000E+00 |
| R2 | −2.37068E+01 | −8.00280E−02 | −3.12300E−02 | 2.86730E−02 | −5.70920E−03 | 0.00000E+00 |
| R3 | −1.20954E+00 | 4.87850E−01 | −2.94620E−01 | 9.43860E−02 | −1.26260E−02 | 0.00000E+00 |
| R4 | 5.63067E+00 | −1.08110E+03 | 2.27590E+03 | −3.17240E+03 | 2.80800E+03 | −1.42800E+03 |
| R5 | −7.83391E−01 | 2.12890E+02 | −4.53880E+02 | 2.46840E+02 | 1.22750E+03 | −3.23460E+03 |
| R6 | 7.03698E−01 | −1.78070E+03 | 6.23230E+03 | −1.57570E+04 | 2.86650E+04 | −3.70490E+04 |
| R7 | 3.98745E+01 | 3.55800E+03 | −1.01020E+04 | 2.06700E+04 | −3.05530E+04 | 3.23030E+04 |
| R8 | 7.18290E−01 | 1.20250E+02 | −2.13280E+02 | 2.66970E+02 | −2.38300E+02 | 1.50860E+02 |
| R9 | 6.45781E+00 | 1.39680E+02 | −2.13280E+02 | 2.32510E+02 | −1.82150E+02 | 1.01790E+02 |
| R10 | −1.11044E+00 | −8.13310E+00 | 8.07020E+00 | −5.74990E+00 | 2.93680E+00 | −1.06240E+00 |
| R11 | −1.04293E+00 | 4.99500E−02 | −1.12300E−02 | 6.38680E−04 | 4.73950E−04 | −1.77950E−04 |
| R12 | −4.33714E+00 | 1.57600E−02 | −4.79510E−03 | 1.06670E−03 | −1.73120E−04 | 2.02380E−05 |

| | Conic Coefficient | Aspherical Coefficient | | | | |
|---|---|---|---|---|---|---|
| | k | A24 | A26 | A28 | A30 | / |
| R1 | −3.73247E+01 | 0.00000E+00 | 0.00000E+00 | 0.00000E+00 | 0.00000E+00 | / |
| R2 | −2.37068E+01 | 0.00000E+00 | 0.00000E+00 | 0.00000E+00 | 0.00000E+00 | / |
| R3 | −1.20954E+00 | 0.00000E+00 | 0.00000E+00 | 0.00000E+00 | 0.00000E+00 | / |
| R4 | 5.63067E+00 | 3.17450E+02 | 0.00000E+00 | 0.00000E+00 | 0.00000E+00 | / |
| R5 | −7.83391E−01 | 3.28120E+03 | −1.26080E+03 | 0.00000E+00 | 0.00000E+00 | / |
| R6 | 7.03698E−01 | 3.31190E+04 | −1.94350E+04 | 6.72730E+03 | −1.04000E+03 | / |
| R7 | 3.98745E+01 | −2.38080E+04 | 1.16100E+04 | −3.36540E+03 | 4.38830E+02 | / |
| R8 | 7.18290E−01 | −6.61960E+01 | 1.91420E+01 | −3.28090E+00 | 2.52450E−01 | / |
| R9 | 6.45781E+00 | −3.95950E+01 | 1.01870E+01 | −1.55810E+00 | 1.07240E−01 | / |
| R10 | −1.11044E+00 | 2.64670E−01 | −4.29650E−02 | 4.06400E−03 | −1.68330E−04 | / |

TABLE 6-continued

| | | | | | | |
|---|---|---|---|---|---|---|
| R11 | −1.04293E+00 | 3.22190E−05 | −3.40590E−06 | 2.01480E−07 | −5.18040E−09 | / |
| R12 | −4.33714E+00 | −1.65750E−06 | 9.01890E−08 | −2.92660E−09 | 4.28500E−11 | / |

Figure 10:
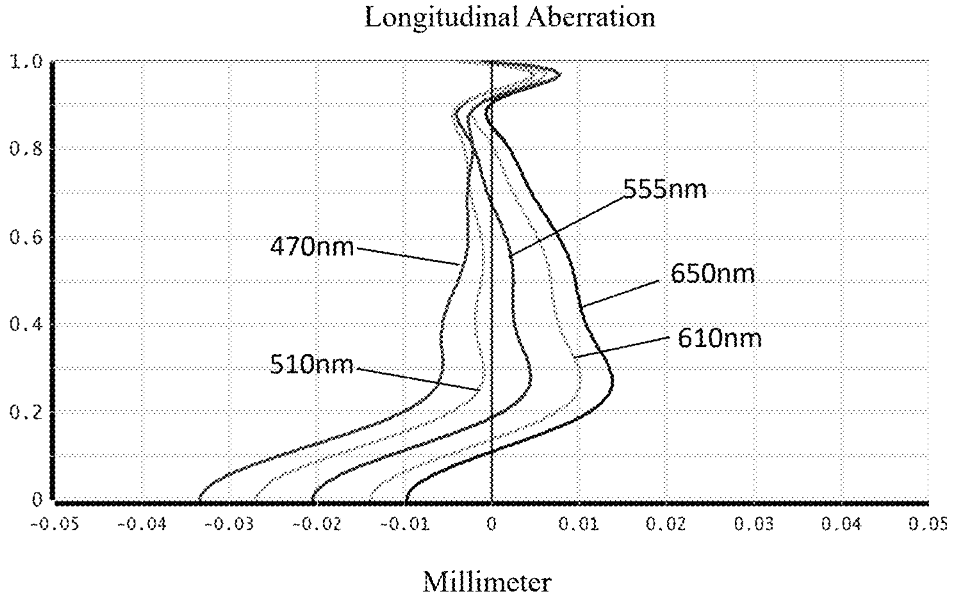
FIG. 10 is a schematic diagram of longitudinal aberration of the camera optical lens shown in FIG. 9.
Figure 11:
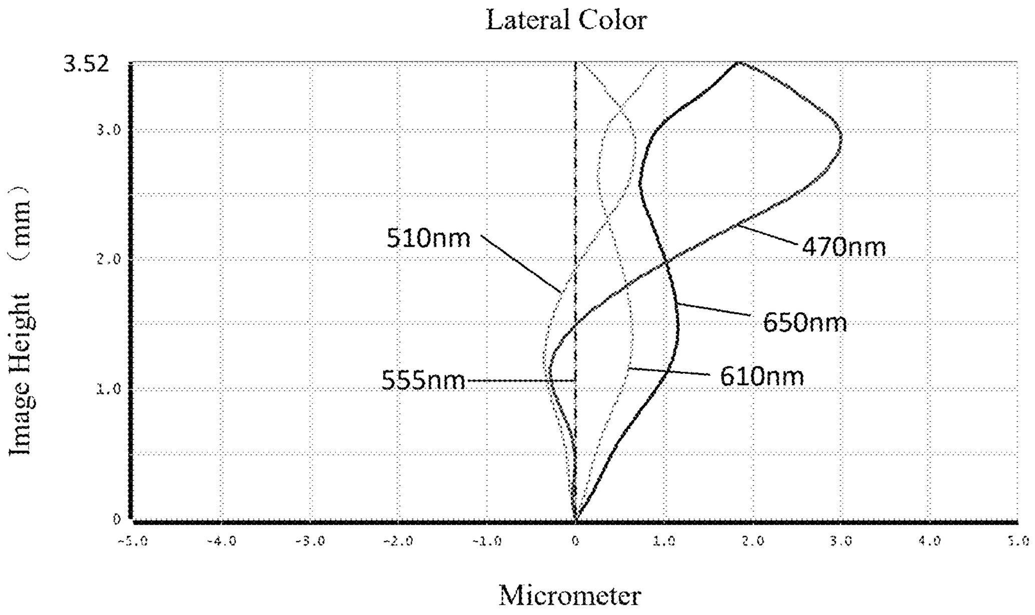
FIG. 11 is a schematic diagram of lateral color of the camera optical lens shown in FIG. 9.
Figure 12:
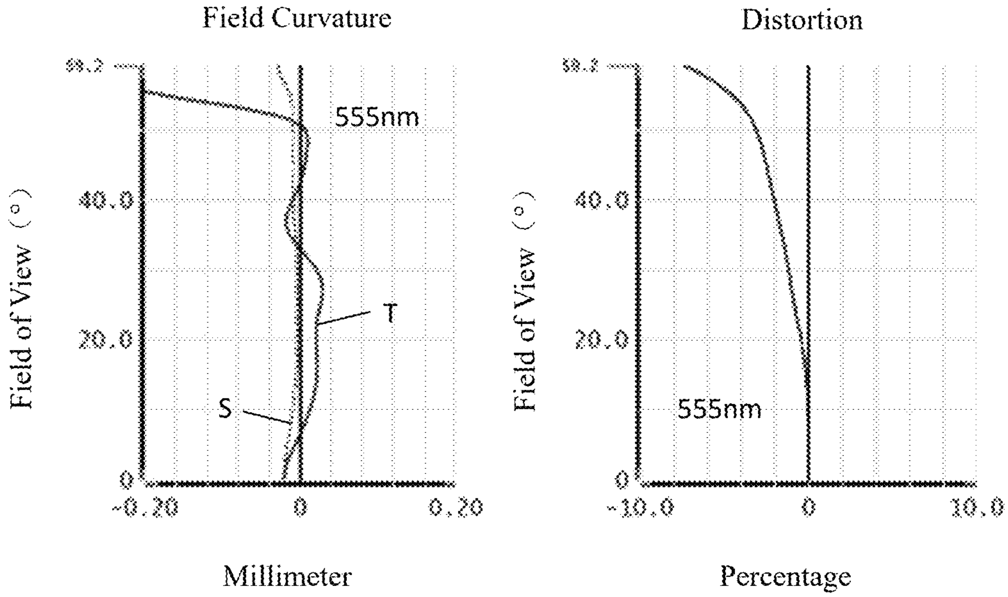
FIG. 12 is a schematic diagram of field curvature and distortion of the camera optical lens shown in FIG. 9.

FIG. 10 and FIG. 11 respectively show longitudinal aberration and lateral color of light with wavelengths of 650 nm, 610 nm, 555 nm, 510 nm, and 470 nm after passing through the camera optical lens 30 according to Example 3. FIG. 12 shows field curvature and distortion of light with a wavelength of 555 nm after passing through the camera optical lens 30 according to Example 3. The field curvature S in FIG. 12 is the field curvature in the sagittal direction, and T is the field curvature in the meridian direction.

In this example, the entrance pupil diameter ENPD of the camera optical lens 30 is 1.218 mm, the full field of view (1.0 field of view) image height IH is 3.518 mm, and the field of view FOV in the diagonal direction of the full field of view (1.0 field of view) is 118.40°; the camera optical lens 30 meets the design requirements of large aperture, wide-angle and ultra-thinness, and the on-axis and off-axis chromatic aberration thereof are fully corrected. The camera optical lens 30 has good optical characteristics.

Example 4

The meaning of the reference signs of Example 4 is the same as that of Example 1.

Figure 13:
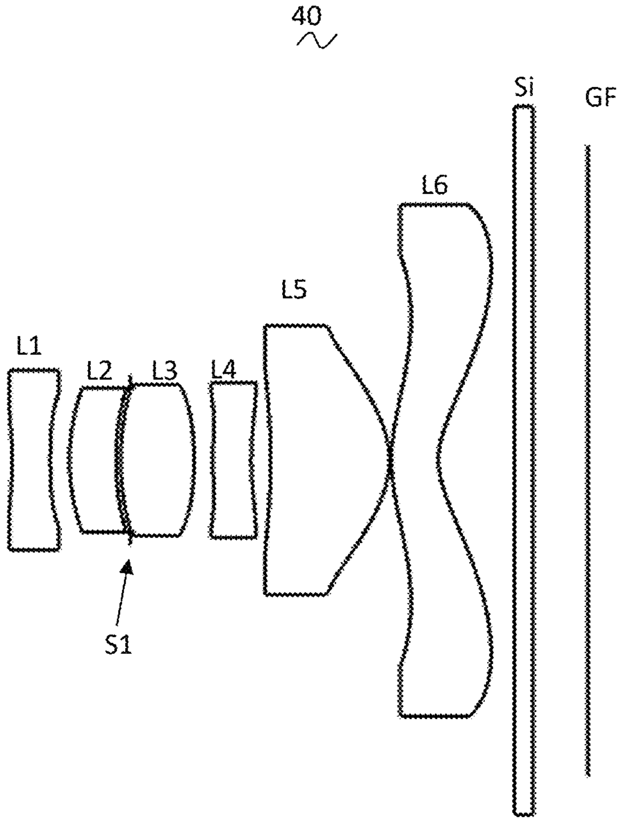
FIG. 13 is a structural schematic diagram of a camera optical lens according to Example 4 of the present disclosure.

FIG. 13 shows a camera optical lens 40 according to Example 4 of the present disclosure.

Table 7 and Table 8 show design data of the camera optical lens 40 according to Example 4 of the present disclosure.

TABLE 7

| | R | d | | | nd | | vd |
|---|---|---|---|---|---|---|---|
| S1 | ∞ | d0= | −1.324 | | | | |
| R1 | −3.245 | d1= | 0.429 | nd1 | 1.5444 | v1 | 55.82 |
| R2 | 11.317 | d2= | 0.214 | | | | |
| R3 | 2.340 | d3= | 0.521 | nd2 | 1.6153 | v2 | 25.94 |
| R4 | 3.094 | d4= | 0.052 | | | | |
| R5 | 3.027 | d5= | 0.823 | nd3 | 1.5444 | v3 | 55.82 |
| R6 | −3.666 | d6= | 0.212 | | | | |
| R7 | 5.522 | d7= | 0.429 | nd4 | 1.6700 | v4 | 19.39 |
| R8 | 2.960 | d8= | 0.218 | | | | |
| R9 | −6.495 | d9= | 1.333 | nd5 | 1.5444 | v5 | 55.82 |
| R10 | −0.928 | d10= | 0.020 | | | | |
| R11 | 1.875 | d11= | 0.525 | nd6 | 1.6400 | v6 | 23.54 |
| R12 | 0.783 | d12= | 0.853 | | | | |
| R13 | ∞ | d13= | 0.210 | ndg | 1.5168 | vg | 64.17 |
| R14 | ∞ | d14= | 0.617 | | | | |

Table 8 shows aspherical surface data of each lens in the camera optical lens according to Example 4 of the present disclosure.

TABLE 8

| | Conic Coefficient | Aspherical Coefficient | | | | |
|---|---|---|---|---|---|---|
| | k | A4 | A6 | A8 | A10 | A12 |
| R1 | −4.86416E+01 | 1.07040E−01 | −7.30520E−02 | 3.91600E−02 | −1.66090E−02 | 4.86040E−03 |
| R2 | −1.80450E+02 | 3.60380E−01 | −3.86620E−01 | 4.37560E−01 | −4.41370E−01 | 2.91040E−01 |
| R3 | −1.68221E+00 | 5.99200E−02 | −1.17300E−01 | 3.81410E−02 | 1.88490E−01 | −4.38530E−01 |
| R4 | 2.52336E+00 | 4.01930E−02 | −7.92290E−01 | 9.77680E+00 | −7.24320E+01 | 3.43950E+02 |
| R5 | 6.44577E−01 | 1.28270E−02 | 1.35060E−01 | −1.32950E+00 | 1.00870E+01 | −5.67470E+01 |
| R6 | 7.17356E−01 | −1.51810E−01 | −2.44330E−01 | 5.50070E+00 | −5.42280E+01 | 3.67040E+02 |
| R7 | 2.43453E+01 | −3.61710E−01 | 1.36180E+00 | −1.75500E+01 | 1.53910E+02 | −8.90410E+02 |
| R8 | 6.25164E−01 | −1.67440E−01 | 8.73520E−02 | −1.45630E+00 | 1.13930E+01 | −4.63870E+01 |
| R9 | 8.20504E+00 | 5.25250E−02 | 2.20330E−01 | −3.52370E+00 | 1.94870E+01 | −6.39090E+01 |
| R10 | −1.17763E+00 | 2.71700E−01 | −5.01370E−01 | 1.23590E+00 | −3.05210E+00 | 5.86700E+00 |
| R11 | −1.02145E+00 | −2.10720E−01 | 2.41520E−01 | −2.75880E−01 | 2.29480E−01 | −1.31410E−01 |
| R12 | −4.36755E+00 | −5.95070E−02 | 6.67270E−02 | −7.75660E−02 | 6.44130E−02 | −3.76410E−02 |

| | Conic Coefficient | Aspherical Coefficient | | | | |
|---|---|---|---|---|---|---|
| | k | A14 | A16 | A18 | A20 | A22 |
| R1 | −4.86416E+01 | −1.27020E−03 | 1.23050E−05 | −9.50440E−05 | −7.66310E−05 | 0.00000E+00 |
| R2 | −1.80450E+02 | −8.64620E−02 | −4.75440E−02 | −3.73130E−03 | −6.41450E−02 | 0.00000E+00 |
| R3 | −1.68221E+00 | 4.90370E−01 | −2.90760E−01 | 1.02630E−01 | 1.98450E−03 | 0.00000E+00 |
| R4 | 2.52336E+00 | −1.08120E+03 | 2.27590E+03 | −3.17250E+03 | 2.80800E+03 | −1.42800E+03 |
| R5 | 6.44577E−01 | 2.12900E+02 | −4.53600E+02 | 2.46780E+02 | 1.22710E+03 | −3.23650E+03 |
| R6 | 7.17356E−01 | −1.78070E+03 | 6.23240E+03 | −1.57570E+04 | 2.86650E+04 | −3.70490E+04 |
| R7 | 2.43453E+01 | 3.55800E+03 | −1.01020E+04 | 2.06700E+04 | −3.05520E+04 | 3.23030E+04 |
| R8 | 6.25164E−01 | 1.20250E+02 | −2.13290E+02 | 2.66970E+02 | −2.38300E+02 | 1.50860E+02 |
| R9 | 8.20504E+00 | 1.39680E+02 | −2.13280E+02 | 2.32510E+02 | −1.82150E+02 | 1.01790E+02 |
| R10 | −1.17763E+00 | −8.13310E+00 | 8.07020E+00 | −5.74990E+00 | 2.93680E+00 | −1.06240E+00 |
| R11 | −1.02145E+00 | 4.99500E−02 | −1.12300E−02 | 6.38690E−04 | 4.73950E−04 | −1.77950E−04 |
| R12 | −4.36755E+00 | 1.57600E−02 | −4.79510E−03 | 1.06670E−03 | −1.73120E−04 | 2.02380E−05 |

| | Conic Coefficient | Aspherical Coefficient | | | | |
|---|---|---|---|---|---|---|
| | k | A24 | A26 | A28 | A30 | / |
| R1 | −4.86416E+01 | 0.00000E+00 | 0.00000E+00 | 0.00000E+00 | 0.00000E+00 | / |
| R2 | −1.80450E+02 | 0.00000E+00 | 0.00000E+00 | 0.00000E+00 | 0.00000E+00 | / |

TABLE 8-continued

| | | | | | | |
|---|---|---|---|---|---|---|
| R3 | −1.68221E+00 | 0.00000E+00 | 0.00000E+00 | 0.00000E+00 | 0.00000E+00 | / |
| R4 | 2.52336E+00 | 3.17390E+02 | 0.00000E+00 | 0.00000E+00 | 0.00000E+00 | / |
| R5 | 6.44577E−01 | 3.28010E+03 | −1.25610E+03 | 0.00000E+00 | 0.00000E+00 | / |
| R6 | 7.17356E−01 | 3.31190E+04 | −1.94350E+04 | 6.72730E+03 | −1.04010E+03 | / |
| R7 | 2.43453E+01 | −2.38080E+04 | 1.16100E+04 | −3.36520E+03 | 4.39290E+02 | / |
| R8 | 6.25164E−01 | −6.61960E+01 | 1.91410E+01 | −3.28130E+00 | 2.52380E−01 | / |
| R9 | 8.20504E+00 | −3.95950E+01 | 1.01870E+01 | −1.55800E+00 | 1.07270E−01 | / |
| R10 | −1.17763E+00 | 2.64670E−01 | −4.29650E−02 | 4.06400E−03 | −1.68350E−04 | / |
| R11 | −1.02145E+00 | 3.22190E−05 | −3.40590E−06 | 2.01470E−07 | −5.17980E−09 | / |
| R12 | −4.36755E+00 | −1.65750E−06 | 9.01890E−08 | −2.92660E−09 | 4.28510E−11 | / |

Figure 14:
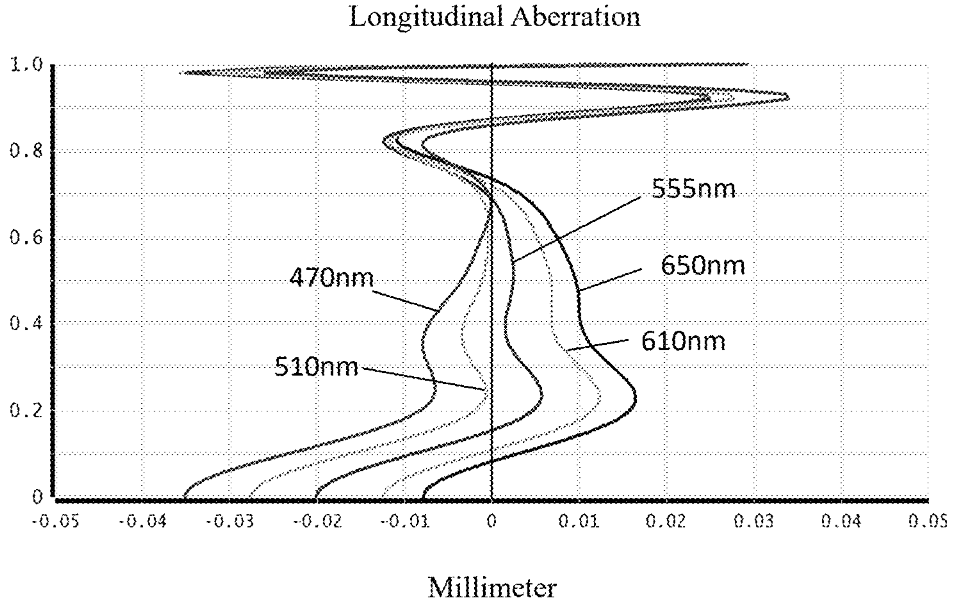
FIG. 14 is a schematic diagram of longitudinal aberration of the camera optical lens shown in FIG. 13.
Figure 15:
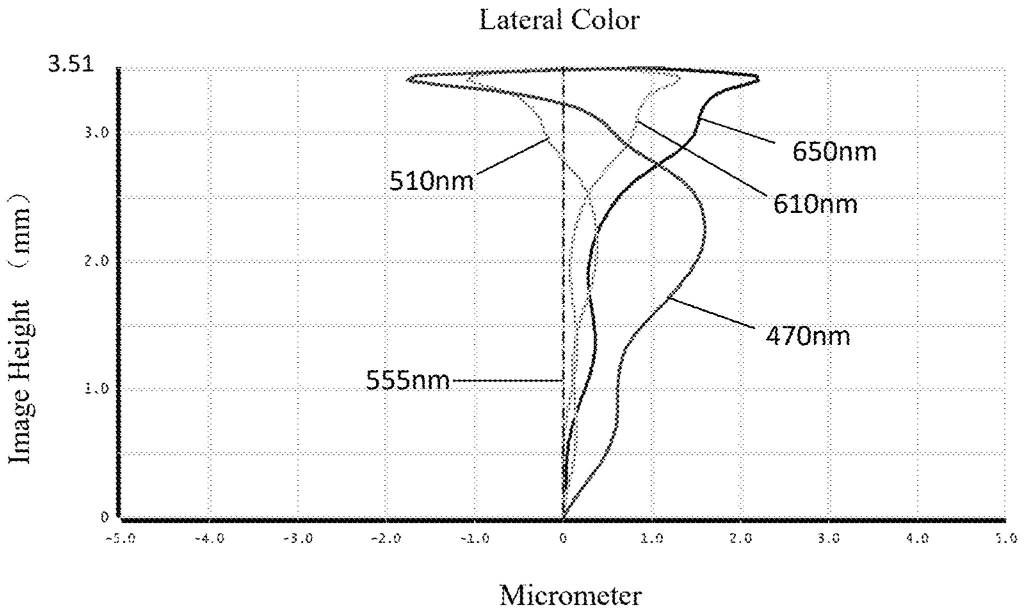
FIG. 15 is a schematic diagram of lateral color of the camera optical lens shown in FIG. 13.
Figure 16:
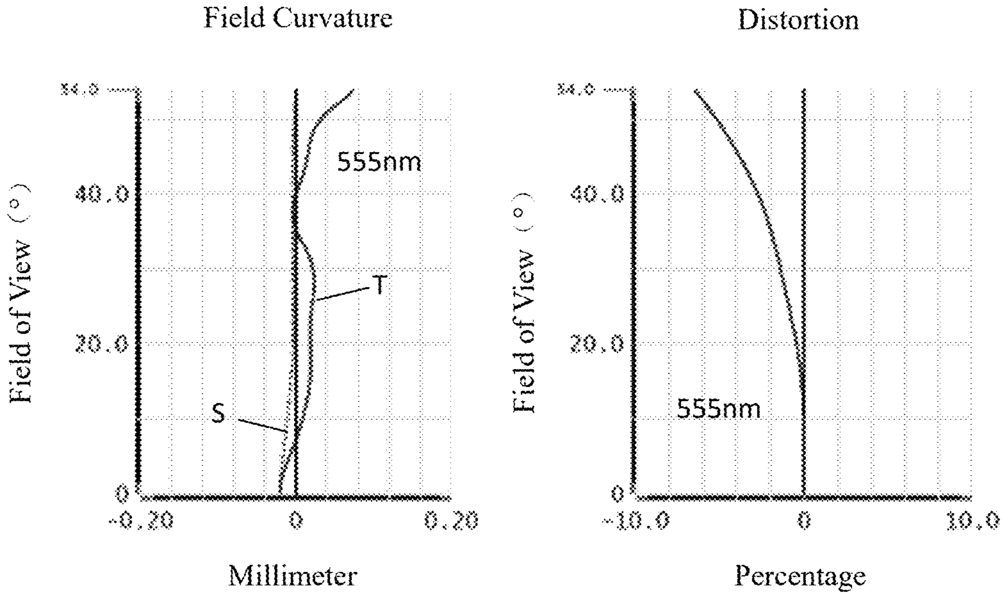
FIG. 16 is a schematic diagram of field curvature and distortion of the camera optical lens shown in FIG. 13.

FIG. 14 and FIG. 15 respectively show longitudinal aberration and lateral color of light with wavelengths of 650 nm, 610 nm, 555 nm, 510 nm, and 470 nm after passing through the camera optical lens 40 according to Example 4. FIG. 16 shows field curvature and distortion of light with a wavelength of 555 nm after passing through the camera optical lens 40 according to Example 4. The field curvature S in FIG. 16 is the field curvature in the sagittal direction, and T is the field curvature in the meridian direction.

In this example, the entrance pupil diameter ENPD of the camera optical lens 40 is 1.483 mm, the full field of view (1.0 field of view) image height IH is 3.510 mm, and the field of view FOV in the diagonal direction of the full field of view (1.0 field of view) is 108.04°; the camera optical lens 40 meets the design requirements of large aperture, wide-angle and ultra-thinness, and the on-axis and off-axis chromatic aberration thereof are fully corrected. The camera optical lens 40 has good optical characteristics.

Comparative Example

The meaning of the reference signs of Comparative Example is the same as that of Example 1.

Figure 17:
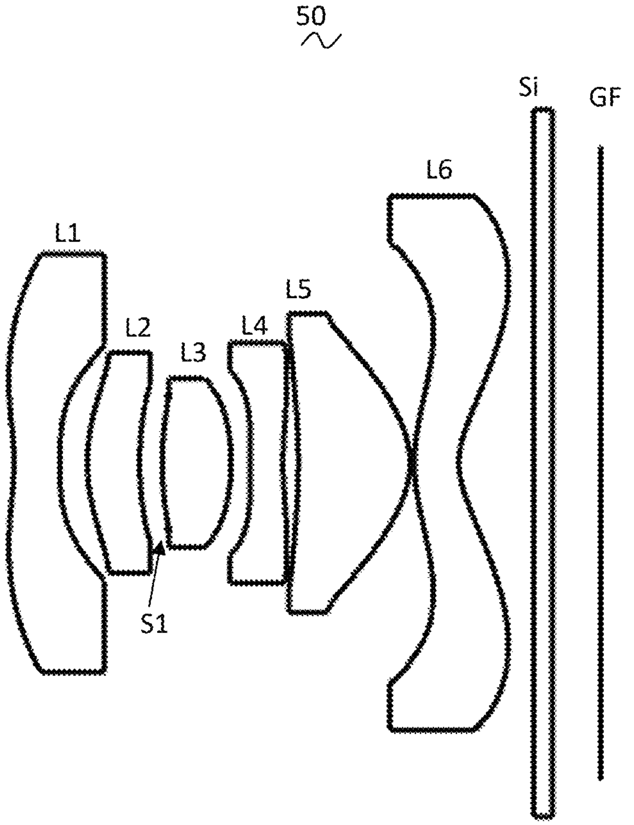
FIG. 17 is a schematic structural diagram of a camera optical lens according to Comparative Example of the present disclosure.

FIG. 17 shows a camera optical lens 50 according to Comparative Example in the present disclosure.

Table 9 and Table 10 show design data of the camera optical lens 50 according to Comparative Example in the present disclosure.

TABLE 9

| | R | d | | nd | | vd | |
|---|---|---|---|---|---|---|---|
| S1 | ∞ | d0= | −1.731 | | | | |
| R1 | −2.542 | d1= | 0.512 | nd1 | 1.5444 | v1 | 55.82 |
| R2 | 6.997 | d2= | 0.311 | | | | |
| R3 | 2.206 | d3= | 0.586 | nd2 | 1.6153 | v2 | 25.94 |
| R4 | 3.763 | d4= | 0.253 | | | | |
| R5 | 3.728 | d5= | 0.771 | nd3 | 1.5444 | v3 | 55.82 |
| R6 | −2.549 | d6= | 0.214 | | | | |
| R7 | 12.723 | d7= | 0.369 | nd4 | 1.6700 | v4 | 19.39 |
| R8 | 3.606 | d8= | 0.172 | | | | |
| R9 | −6.257 | d9= | 1.255 | nd5 | 1.5444 | v5 | 55.82 |
| R10 | −0.917 | d10= | 0.046 | | | | |
| R11 | 1.827 | d11= | 0.499 | nd6 | 1.6400 | v6 | 23.54 |
| R12 | 0.799 | d12= | 0.836 | | | | |
| R13 | ∞ | d13= | 0.210 | ndg | 1.5168 | vg | 64.17 |
| R14 | ∞ | d14= | 0.548 | | | | |

Table 10 shows aspherical surface data of each lens in the camera optical lens according to Comparative Example in the present disclosure.

TABLE 10

| | Conic Coefficient | Aspherical Coefficient | | | | |
|---|---|---|---|---|---|---|
| | k | A4 | A6 | A8 | A10 | A12 |
| R1 | −2.74980E+01 | 1.07660E−01 | −7.21540E−02 | 3.93560E−02 | −1.64250E−02 | 5.04720E−03 |
| R2 | −2.89142E+01 | 3.69200E−01 | −3.80180E−01 | 4.38150E−01 | −4.42700E−01 | 2.93460E−01 |
| R3 | −2.17382E+00 | 5.70750E−02 | −1.22610E−01 | 3.10100E−02 | 1.84320E−01 | −4.39410E−01 |
| R4 | 2.53555E+00 | 4.05430E−02 | −8.10760E−01 | 9.78510E+00 | −7.24080E+01 | 3.43960E+02 |
| R5 | −3.27274E+00 | 8.19420E−03 | 1.13430E−01 | −1.34900E+00 | 1.01230E+01 | −5.67390E+01 |
| R6 | 3.95101E−01 | −1.52490E−01 | −2.54100E−01 | 5.50200E+00 | −5.42240E+01 | 3.67050E+02 |
| R7 | 6.32162E+01 | −3.71840E−01 | 1.36470E+00 | −1.75470E+01 | 1.53880E+02 | −8.90380E+02 |
| R8 | 1.35282E+00 | −1.64480E−01 | 8.88870E−02 | −1.45710E+00 | 1.13930E+01 | −4.63870E+01 |
| R9 | 7.64517E+00 | 6.35200E−02 | 2.16760E−01 | −3.52350E+00 | 1.94870E+01 | −6.39090E+01 |
| R10 | −1.11475E+00 | 2.63220E−01 | −5.02680E−01 | 1.23630E+00 | −3.05240E+00 | 5.86680E+00 |
| R11 | −1.01156E+00 | −2.11430E−01 | 2.40570E−01 | −2.76090E−01 | 2.29460E−01 | −1.31410E−01 |
| R12 | −4.46133E+00 | −5.87240E−02 | 6.60820E−02 | −7.75240E−02 | 6.44140E−02 | −3.76400E−02 |

| | Conic Coefficient | Aspherical Coefficient | | | | |
|---|---|---|---|---|---|---|
| | k | A14 | A16 | A18 | A20 | A22 |
| R1 | −2.74980E+01 | −1.08390E−03 | 1.51850E−04 | −1.23790E−05 | 4.44090E−07 | 0.00000E+00 |
| R2 | −2.89142E+01 | −7.95990E−02 | −3.13820E−02 | 2.85390E−02 | −5.94020E−03 | 0.00000E+00 |
| R3 | −2.17382E+00 | 4.87650E−01 | −2.95160E−01 | 9.40730E−02 | −1.25310E−02 | 0.00000E+00 |
| R4 | 2.53555E+00 | −1.08110E+03 | 2.27590E+03 | −3.17250E+03 | 2.80790E+03 | −1.42800E+03 |
| R5 | −3.27274E+00 | 2.12860E+02 | −4.53890E+02 | 2.46810E+02 | 1.22770E+03 | −3.23460E+03 |
| R6 | 3.95101E−01 | −1.78070E+03 | 6.23240E+03 | −1.57570E+04 | 2.86650E+04 | −3.70490E+04 |
| R7 | 6.32162E+01 | 3.55800E+03 | −1.01020E+04 | 2.06700E+04 | −3.05520E+04 | 3.23030E+04 |
| R8 | 1.35282E+00 | 1.20250E+02 | −2.13280E+02 | 2.66970E+02 | −2.38300E+02 | 1.50860E+02 |
| R9 | 7.64517E+00 | 1.39680E+02 | −2.13280E+02 | 2.32510E+02 | −1.82150E+02 | 1.01790E+02 |
| R10 | −1.11475E+00 | −8.13310E+00 | 8.07020E+00 | −5.74990E+00 | 2.93680E+00 | −1.06240E+00 |

TABLE 10-continued

| | | | | | | |
|---|---|---|---|---|---|---|
| R11 | −1.01156E+00 | 4.99510E−02 | −1.12300E−02 | 6.38680E−04 | 4.73950E−04 | −1.77950E−04 |
| R12 | −4.46133E+00 | 1.57600E−02 | −4.79510E−03 | 1.06670E−03 | −1.73120E−04 | 2.02380E−05 |

| | Conic Coefficient | Aspherical Coefficient | | | | |
|---|---|---|---|---|---|---|
| | k | A24 | A26 | A28 | A30 | / |
| R1 | −2.74980E+01 | 0.00000E+00 | 0.00000E+00 | 0.00000E+00 | 0.00000E+00 | / |
| R2 | −2.89142E+01 | 0.00000E+00 | 0.00000E+00 | 0.00000E+00 | 0.00000E+00 | / |
| R3 | −2.17382E+00 | 0.00000E+00 | 0.00000E+00 | 0.00000E+00 | 0.00000E+00 | / |
| R4 | 2.53555E+00 | 3.17560E+02 | 0.00000E+00 | 0.00000E+00 | 0.00000E+00 | / |
| R5 | −3.27274E+00 | 3.28110E+03 | −1.26120E+03 | 0.00000E+00 | 0.00000E+00 | / |
| R6 | 3.95101E−01 | 3.31190E+04 | −1.94350E+04 | 6.72730E+03 | −1.04000E+03 | / |
| R7 | 6.32162E+01 | −2.38080E+04 | 1.16100E+04 | −3.36540E+03 | 4.38830E+02 | / |
| R8 | 1.35282E+00 | −6.61960E+01 | 1.91420E+01 | −3.28090E+00 | 2.52450E−01 | / |
| R9 | 7.64517E+00 | −3.95950E+01 | 1.01870E+01 | −1.55810E+00 | 1.07240E−01 | / |
| R10 | −1.11475E+00 | 2.64670E−01 | −4.29650E−02 | 4.06400E−03 | −1.68350E−04 | / |
| R11 | −1.01156E+00 | 3.22190E−05 | −3.40590E−06 | 2.01480E−07 | −5.18080E−09 | / |
| R12 | −4.46133E+00 | −1.65750E−06 | 9.01890E−08 | −2.92660E−09 | 4.28490E−11 | / |

Figure 18:
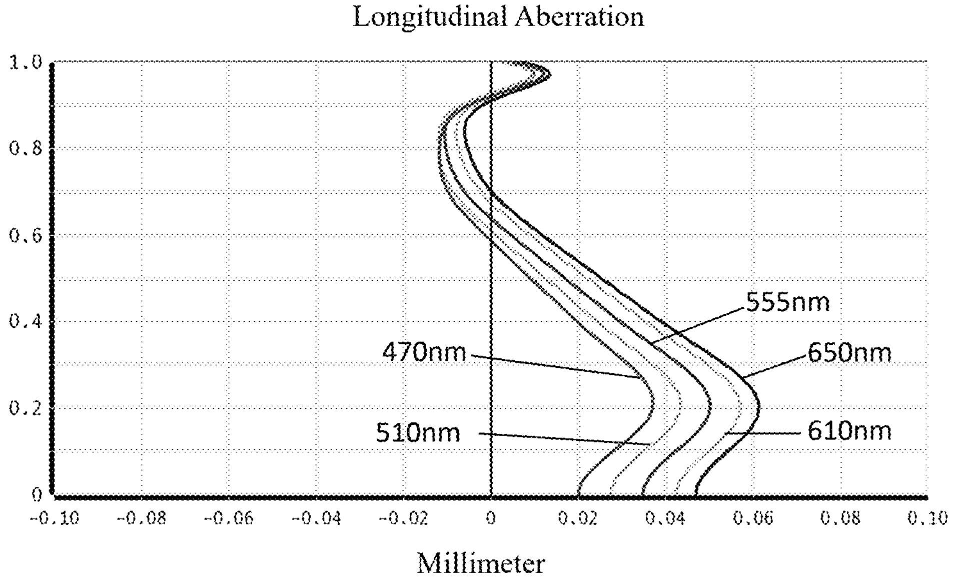
FIG. 18 is a schematic diagram of longitudinal aberration of the camera optical lens shown in FIG. 17.
Figure 19:
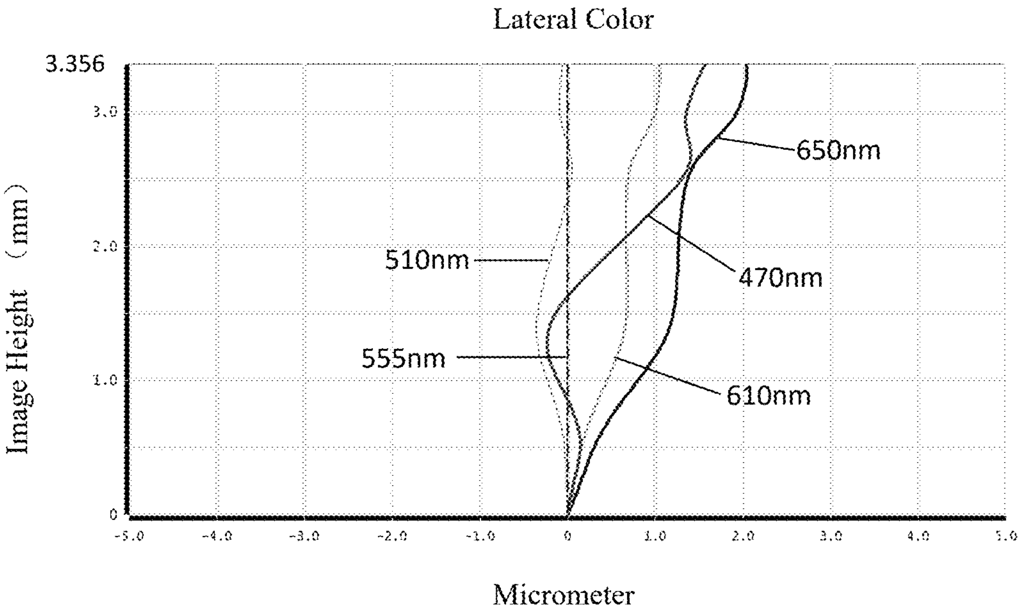
FIG. 19 is a schematic diagram of lateral color of the camera optical lens shown in FIG. 17.
Figure 20:
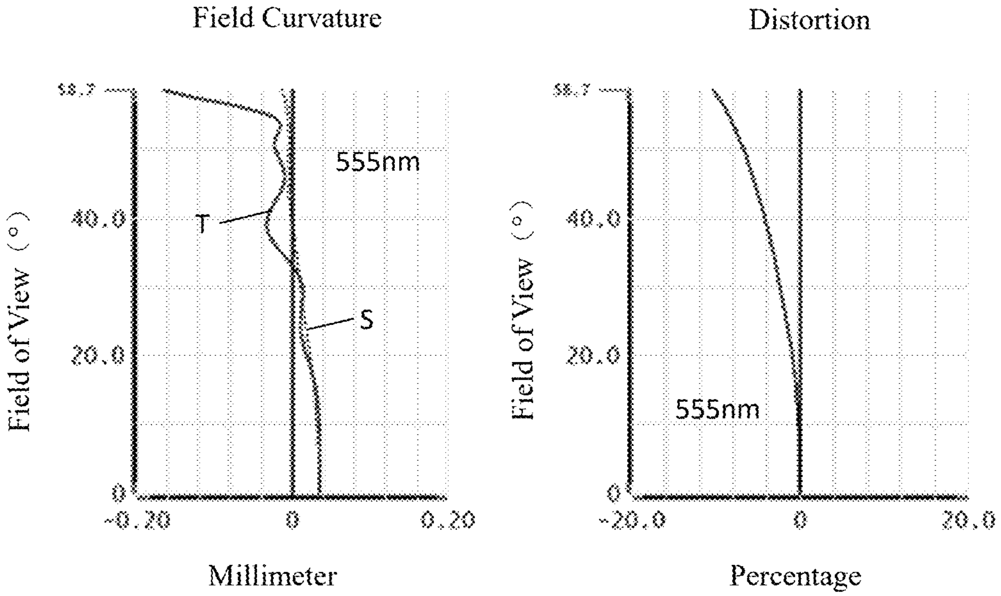
FIG. 20 is a schematic diagram of field curvature and distortion of the camera optical lens shown in FIG. 17.

FIG. 18 and FIG. 19 respectively show longitudinal aberration and lateral color of light with wavelengths of 650 nm, 610 nm, 555 nm, 510 nm, and 470 nm after passing through the camera optical lens 50 according to Comparative Example. FIG. 20 shows field curvature and distortion of light with a wavelength of 555 nm after passing through the camera optical lens 50 according to Comparative Example. The field curvature S in FIG. 20 is the field curvature in the sagittal direction, and T is the field curvature in the meridian direction.

Table 11 below lists values corresponding to each relational expression in Comparative Example according to the above relational expressions. The camera optical lens 50 of Comparative Example does not satisfy the above relational expression 7.00≤(f2−f4)/f≤10.00.

In Comparative Example, the entrance pupil diameter ENPD of the camera optical lens 50 is 1.242 mm, the full field of view (1.0 field of view) image height IH is 3.356 mm, and the field of view FOV in the diagonal direction of the full field of view (1.0 field of view) is 117.37°; the camera optical lens 50 does not meet the design requirements of large aperture, wide-angle and ultra-thinness, and the on-axis and off-axis chromatic aberration thereof are not fully corrected. The camera optical lens 50 does not have good optical characteristics.

TABLE 11

| Parameters and Relational Expressions | Example 1 | Example 2 | Example 3 | Example 4 | Comparative Example |
|---|---|---|---|---|---|
| (f2 − f4)/f | 8.74 | 9.99 | 7.00 | 8.15 | 6.56 |
| (d1 + d3)/d2 | 3.57 | 2.51 | 4.49 | 4.44 | 3.53 |
| R1/R2 | −0.33 | −0.20 | −0.60 | −0.29 | −0.36 |
| R7/R6 | −2.73 | −5.00 | −4.95 | −1.51 | −4.99 |
| \|SAG52/SD52\| | 0.58 | 0.70 | 0.61 | 0.47 | 0.56 |
| FOV*f/IH | 73.70 | 65.09 | 75.88 | 84.51 | 78.97 |
| f | 2.157 | 2.071 | 2.254 | 2.746 | 2.300 |
| f1 | −3.604 | −3.900 | −3.547 | −4.570 | −3.350 |
| f2 | 9.099 | 13.546 | 8.561 | 12.257 | 7.526 |
| f3 | 2.898 | 2.589E+00 | 2.834 | 3.173 | 2.898 |
| f4 | −9.753 | −7.148 | −7.230 | −10.115 | −7.565 |
| f5 | 1.839 | 1.701 | 1.757 | 1.829 | 1.816 |
| f6 | −2.758 | −2.378 | −2.649 | −2.570 | −2.718 |
| FNO | 1.852 | 1.852 | 1.851 | 1.852 | 1.852 |
| TTL | 6.725 | 6.572 | 6.571 | 6.456 | 6.582 |

Those skilled in the art may understand that the above examples are specific embodiments for implementing the present disclosure, and in practical applications, various changes may be made in form and detail without departing from the spirit and scope of the present disclosure.

What is claimed is:

1. A camera optical lens, sequentially comprising six lenses from an object side to an image side: a first lens having negative refractive power, a second lens having positive refractive power, a third lens having positive refractive power, a fourth lens having negative refractive power, and a fifth lens having positive refractive power, and a sixth lens having negative refractive power;

wherein a focal length of the camera optical lens is f, a focal length of the second lens is f2, a focal length of the fourth lens is f4, an on-axis thickness of the first lens is d1, an on-axis thickness of the second lens is d3, an on-axis distance from an image side surface of the first lens to an object side surface of the second lens is d2, a central curvature radius of an object side surface of the first lens in a paraxial region is R1, a central curvature radius of an image side surface of the first lens in the paraxial region is R2, a central curvature radius of an image side surface of the third lens in the paraxial region is R6, and a central curvature radius of an object side surface of the fourth lens in the paraxial region is R7, and following relational expressions are satisfied:

$$7.00 \le (f2 - f4)/f \le 10.00;$$

$$2.50 \le (d1 + d3)/d2 \le 4.50;$$

$$-0.70 \le R1/R2 \le -0.20; \text{ and}$$

$$-5.00 \le R7/R6 \le -1.50.$$

2. The camera optical lens as described in claim 1, wherein an on-axis distance from an intersection point of an image side surface of the fifth lens and the optical axis to a vertex of an effective radius of the image side surface of the fifth lens is SAG52; and an effective radius of the image side surface of the fifth lens is SD52, and a following relational expression is satisfied:

$$0.45 \le |SAG52/SD52| \le 0.70.$$

3. The camera optical lens as described in claim 1, wherein a field of view of the camera optical lens in a 1.0 field of view is FOV; and an image height of the camera optical lens in the 1.0 field of view is IH, and a following relational expression is satisfied:

$$65.00 \leq FOV*f/IH \leq 85.00.$$

4. The camera optical lens as described in claim 1, wherein an object side surface of the first lens is concave in a paraxial region, and an image side surface of the first lens is concave in the paraxial region;

a focal length of the first lens is f1, and a total optical length from an object side surface of the first lens to an image plane of the camera optical lens along an optic axis is TTL, and following relational expressions are satisfied:

$$-3.77 \leq f1/f \leq -1.05;$$

$$-1.33 \leq (R1+R2)/(R1-R2) \leq -0.17; \text{ and}$$

$$0.03 \leq d1/TTL \leq 0.14.$$

5. The camera optical lens as described in claim 1, wherein an object side surface of the second lens is convex in a paraxial region, and an image side surface of the second lens is concave in the paraxial region;

a central curvature radius of an object side surface of the second lens in a paraxial region is R3, a central curvature radius of an image side surface of the second lens in the paraxial region is R4, and a total optical length from the object side surface of the first lens to an image plane of the camera optical lens along an optic axis is TTL, and following relational expressions are satisfied:

$$1.90 \leq f2/f \leq 9.81;$$

$$-14.41 \leq (R3+R4)/(R3-R4) \leq -2.69; \text{ and}$$

$$0.04 \leq d3/TTL \leq 0.15.$$

6. The camera optical lens as described in claim 1, wherein an object side surface of the third lens is convex in a paraxial region, and an image side surface of the third lens is convex in the paraxial region;

a focal length of the third lens is f3, a central curvature radius of the object side surface of the third lens in a paraxial region is R5, an on-axis thickness of the third lens is d5, and a total optical length from the object side surface of the first lens to an image plane of the along an optic axis of the camera optical lens is TTL, and following relational expressions are satisfied:

$$0.58 \leq f3/f \leq 2.02;$$

$$-0.19 \leq (R5+R6)/(R5-R6) \leq 0.29; \text{ and}$$

$$0.06 \leq d5/TTL \leq 0.19.$$

7. The camera optical lens as described in claim 1, wherein an object side surface of the fourth lens is convex in a paraxial region, and an image side surface of the fourth lens is concave in the paraxial region;

a central curvature radius of the image side surface of the fourth lens in a paraxial region is R8, an on-axis thickness of the fourth lens is d7, and a total optical length from the object side surface of the first lens to an image plane of the camera optical lens along an optic axis is TTL, and following relational expressions are satisfied:

$$-9.04 \leq f4/f \leq -2.14;$$

$$0.89 \leq (R7+R8)/(R7-R8) \leq 4.97; \text{ and}$$

$$0.03 \leq d7/TTL \leq 0.10.$$

8. The camera optical lens as described in claim 1, wherein an object side surface of the fifth lens is concave in a paraxial region, and an image side surface of the fifth lens is convex in the paraxial region;

a focal length of the fifth lens is f5, a central curvature radius of the object side surface of the fifth lens in a paraxial region is R9, a central curvature radius of the image side surface of the fifth lens in the paraxial region is R10, an on-axis thickness of the fifth lens is d9, and a total optical length from an object side surface of the first lens to an image plane of the camera optical lens along an optic axis is TTL, and following relational expressions are satisfied:

$$0.33 \leq f5/f \leq 1.28;$$

$$0.64 \leq (R9+R10)/(R9-R10) \leq 2.00; \text{ and}$$

$$0.09 \leq d9/TTL \leq 0.31.$$

9. The camera optical lens as described in claim 1, wherein an object side surface of the sixth lens is convex in a paraxial region, and an image side surface of the sixth lens is concave in the paraxial region;

a focal length of the sixth lens is f6, a central curvature radius of the object side surface of the sixth lens in a paraxial region is R11, a central curvature radius of the image side surface of the sixth lens in the paraxial region is R12, an on-axis thickness of the sixth lens is d11, and a total optical length from the object side surface of the first lens to an image plane of the camera optical lens along an optic axis is TTL, following relational expressions are satisfied:

$$-2.56 \leq f6/f \leq -0.62;$$

$$1.12 \leq (R11+R12)/(R11-R12) \leq 3.85; \text{ and}$$

$$0.04 \leq d11/TTL \leq 0.13.$$

10. The camera optical lens as described in claim 1, wherein an aperture of the camera optical lens is FNO, and a following relational expression is satisfied: FNO≤1.91.

* * * * *